(12) United States Patent
Kodera

(10) Patent No.: US 11,059,514 B2
(45) Date of Patent: Jul. 13, 2021

(54) STEERING CONTROL DEVICE

(71) Applicant: JTEKT CORPORATION, Osaka (JP)

(72) Inventor: Takashi Kodera, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 269 days.

(21) Appl. No.: 16/423,855

(22) Filed: May 28, 2019

(65) Prior Publication Data
US 2019/0367079 A1 Dec. 5, 2019

(30) Foreign Application Priority Data
Jun. 1, 2018 (JP) .............................. JP2018-106412

(51) Int. Cl.
*B62D 5/04* (2006.01)
*B62D 6/00* (2006.01)
(Continued)

(52) U.S. Cl.
CPC ......... *B62D 5/0463* (2013.01); *B62D 5/0412* (2013.01); *B62D 6/002* (2013.01);
(Continued)

(58) Field of Classification Search
CPC .... B62D 5/0463; B62D 5/0412; B62D 6/002; B62D 6/008; B62D 6/02; B62D 6/04;
(Continued)

(56) References Cited

U.S. PATENT DOCUMENTS

2002/0129988 A1  9/2002 Stout et al.
2017/0267276 A1* 9/2017 Kodera .................... B62D 6/04
(Continued)

FOREIGN PATENT DOCUMENTS

EP  3219580 A1  9/2017
EP  3461721 A2  4/2019
(Continued)

OTHER PUBLICATIONS

Nov. 4, 2019 Search Report issued in European Patent Application No. 19177352.

*Primary Examiner* — Joseph J Dallo
*Assistant Examiner* — Scott A Reinbold
(74) *Attorney, Agent, or Firm* — Oliff PLC

(57) ABSTRACT

An input torque fundamental component computation circuit includes: a torque command value computation circuit that computes a torque command value corresponding to a target value for steering torque that is to be input by a driver for drive torque obtained by adding the steering torque to an input torque fundamental component; and a torque F/B control circuit that computes the input torque fundamental component through execution of torque feedback control for causing the steering torque to follow the torque command value. A target steering angle computation circuit computes a target steering angle on the basis of the input torque fundamental component. A steering-side control circuit computes target reaction force torque on the basis of execution of angle feedback control for causing a steering angle to follow a target steering angle. The torque command value computation circuit computes the torque command value in consideration of the grip state amount.

6 Claims, 21 Drawing Sheets

(51) Int. Cl.
    *B62D 6/02*         (2006.01)
    *B62D 6/04*         (2006.01)
    *B62D 6/08*         (2006.01)

(52) U.S. Cl.
    CPC ................ *B62D 6/008* (2013.01); *B62D 6/02* (2013.01); *B62D 6/04* (2013.01); *B62D 6/08* (2013.01)

(58) Field of Classification Search
    CPC . B62D 6/08; B62D 6/006; B62D 5/04; B62D 6/00; B62D 1/04
    See application file for complete search history.

(56) References Cited

U.S. PATENT DOCUMENTS

2019/0233003 A1\*   8/2019   Kodera .................... B62D 6/00
2019/0367075 A1\*  12/2019   Kodera ................. B62D 6/008

FOREIGN PATENT DOCUMENTS

JP         2017-165219 A     9/2017
JP         2019-069665 A     5/2019

\* cited by examiner

STEERING CONTROL DEVICE

INCORPORATION BY REFERENCE

The disclosure of Japanese Patent Application No. 2018-106412 filed on Jun. 1, 2018 including the specification, drawings and abstract, is incorporated herein by reference in its entirety.

BACKGROUND OF THE INVENTION

1. Field of the Invention

The present invention relates to a steering control device.

2. Description of the Related Art

There has hitherto been a steering device of a steer-by-wire type in which power transfer between a steering portion that is operated by a driver and a steered portion that steers steered wheels in accordance with an operation by the driver is separated. In such a steering device, a road surface reaction force received by the steered wheels is not mechanically transferred to a steering wheel. Therefore, some steering control devices that control the steering device of the steer-by-wire type apply a steering reaction force determined in consideration of road surface information to the steering wheel using a steering-side actuator (steering-side motor). For example, Japanese Patent Application Publication No. 2017-165219 (JP 2017-165219 A) discloses a steering control device focusing on an axial force that acts on a steered shaft coupled to steered wheels, and that determines a steering reaction force in consideration of a distributed axial force obtained by distributing an ideal axial force, which is calculated from a target steered angle in accordance with a target steering angle for a steering wheel, and a road surface axial force, which is calculated from a drive current of a steered-side motor which is a drive source of a steered-side actuator, at predetermined distribution ratios.

The steering control device which controls the steering device of the steer-by-wire type is required to achieve a better steering feeling and, in particular, optimize steering properties which are the relationship between steering torque (steering reaction force) that should be input by the driver and the steered angle of the steered wheels which is output from the steering device for the steering torque. In addition, it is desirable that such a steering control device should facilitate adjustment for optimum steering properties as much as possible, in order to transfer the road surface information etc. to the driver using the steering reaction force as described above.

SUMMARY OF THE INVENTION

It is an object of the present invention to provide a steering control device that facilitates adjustment for optimum steering properties.

An aspect of the present invention provides a steering control device that controls a steering device in which a steering portion and a steered portion, which steers steered wheels in accordance with a steering operation input to the steering portion, are mechanically separated from, or mechanically engageable with and disengageable from, each other. The steering control device includes: a control circuit that controls operation of a steering-side motor that applies a steering reaction force that resists the steering operation which is input to the steering portion. The control circuit includes a torque command value computation circuit that computes a torque command value corresponding to a target value for steering torque that is to be input by a driver for drive torque input to the steering device, a torque feedback control circuit that computes an input torque fundamental component on the basis of execution of torque feedback control in which the steering torque is caused to follow the torque command value, and a target steering, angle computation circuit that computes a target steering angle, which is a target value for a steering angle of a steering wheel coupled to the steering portion, on the basis of the input torque fundamental component. The control circuit computes target reaction force torque, which is a target value for the steering reaction force, on the basis of execution of angle feedback control in which the steering angle is caused to follow the target steering angle.

With the above configuration, the input torque fundamental component is computed by executing torque feedback control in which the steering torque which is to be input by the driver is caused to follow the torque command value which is computed on the basis of the drive torque which is input to the steering device. The thus computed input torque fundamental component is used to compute the target steering angle, and functions to vary the target steering angle and vary the steering reaction force on the basis of such variations in the target steering angle. Consequently, the input torque fundamental component is provided to the steering device as a steering reaction force that acts to maintain the steering torque, which is to be input by the driver, at an appropriate value that matches the drive torque. That is, in the case where the steering properties which indicate the relationship between the steering torque, which should be input by the driver, and the steered angle of the steered wheels, which is output from the steering device for the steering torque, are to be optimized, it is only necessary to adjust the input torque fundamental component through adjustment of the torque command value computation circuit. Thus, it is only necessary to adjust the input torque fundamental component in order to achieve adjustment for optimum steering properties, which facilitates adjustment compared to a case where it is necessary to adjust the input torque fundamental component and a different component in consideration of each other, for example.

In another aspect of the present invention, the steering control device according to the above aspect further may include a plurality of axial force computation circuits that compute a plurality of types of axial forces, which act on a steered shaft to which the steered wheels are coupled, on the basis of different state amounts, and a grip state amount computation circuit that computes a grip state amount on the basis of the plurality of types of axial forces; and the torque command value computation circuit may compute the torque command value in consideration of the grip state amount.

With the above con figuration, the torque command value is computed in consideration of the grip state amount, and the steering reaction force is changed on the basis of the torque command value. The steering properties can be optimized in accordance with the grip state (e.g. the grip level which indicates how much the steered wheels grip on the road surface) of the steered wheels by considering the grip state amount in the computation of the torque command value in this manner.

In still another aspect of the present invention, in the steering device according to the above aspect, the torque command value computation circuit may include a command fundamental value computation circuit that computes a command fundamental value, which is a base of the torque command value, on the basis of the drive torque, and a fundamental adjustment gain computation circuit that computes a fundamental adjustment gain, by which the command fundamental value is to be multiplied; and the fundamental adjustment gain computation circuit may change the fundamental adjustment gain on the basis of the grip state amount.

With the above configuration, the command fundamental value of the torque command value is adjusted by multiplying the command fundamental value by the fundamental adjustment gain. The fundamental adjustment gain is changed on the basis of the grip state amount. Therefore, the effect of the grip state can be reflected in the steering properties as variations in the gradient of the command fundamental value.

In still another aspect of the present invention, in the steering control device according to the above aspect, the fundamental adjustment gain computation circuit may change the fundamental adjustment gain in accordance with a vehicle speed. With the above configuration, the command fundamental value can be adjusted suitably in accordance with the vehicle speed by taking into account the vehicle speed in the computation of the fundamental adjustment gain.

In still another aspect of the present invention, in the steering control device according to the above aspect, the torque command value computation circuit may include a hysteresis component computation circuit that computes a hysteresis component on the basis of the drive torque such that the torque command value has hysteresis characteristics in accordance with a direction of the drive torque, and a hysteresis adjustment gain computation circuit that computes a hysteresis adjustment gain, by which the hysteresis component is to be multiplied; and the hysteresis adjustment gain computation circuit may change the hysteresis adjustment gain on the basis of the grip state amount.

With the above configuration, the hysteresis component of the torque command value is adjusted by multiplying the hysteresis component by the hysteresis adjustment gain. The hysteresis adjustment gain is changed on the basis of the grip state amount. Therefore, the effect of the grip state can be reflected in the steering properties mainly as variations in the sense of friction in the steering feeling.

In still another aspect of the present invention, in the steering control device according to the above aspect, the hysteresis adjustment gain computation circuit may change the hysteresis adjustment gain in accordance with a vehicle speed. With the above con figuration, the hysteresis component can be optimized suitably in accordance with the vehicle speed by taking into account the vehicle speed in the computation of the hysteresis adjustment gain.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
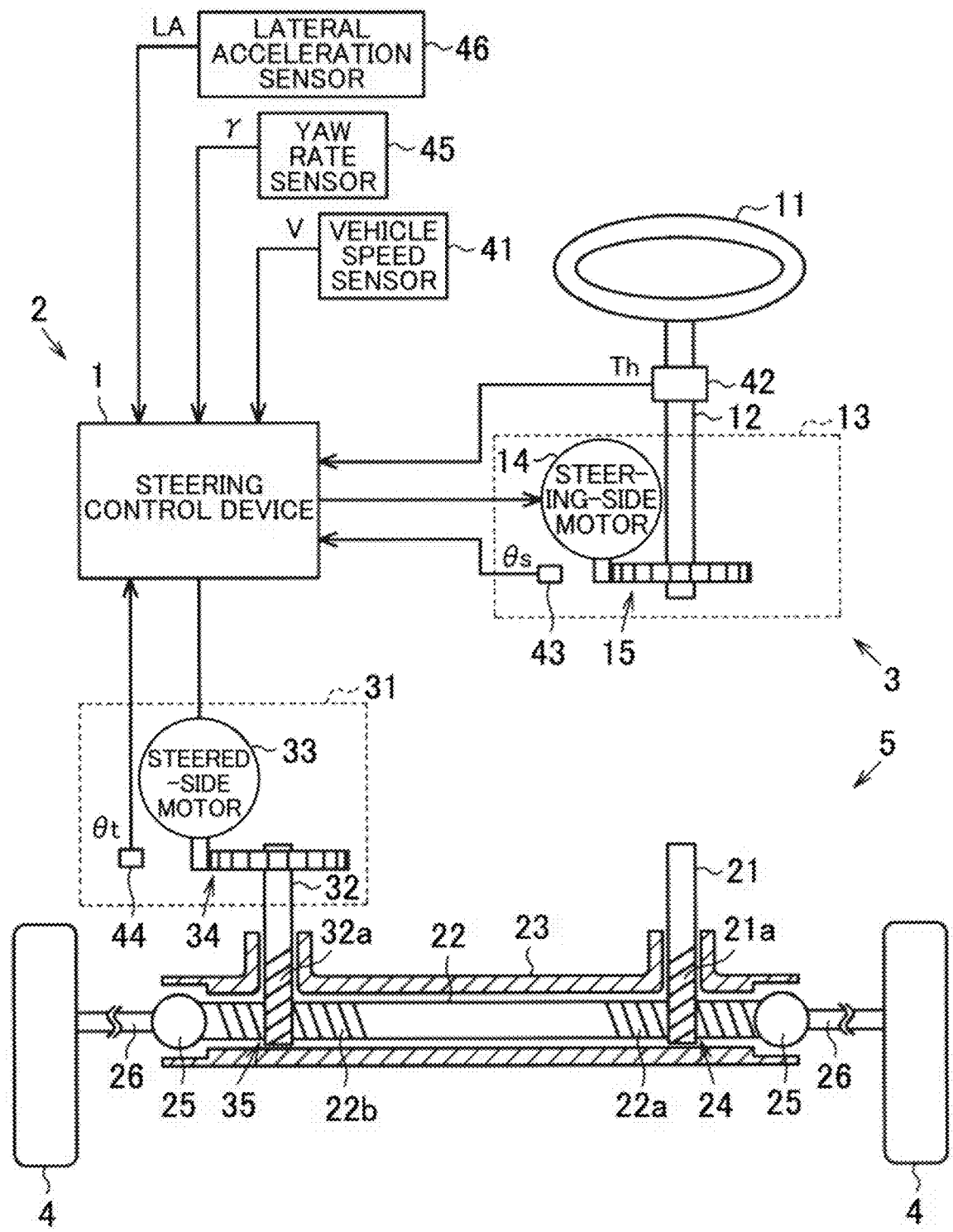
FIG. 1 is a schematic diagram illustrating the configuration of a steering device of a steer-by-wire type according to a first embodiment.

A steering control device according to a first embodiment of the present invention will be described below with reference to the drawings. As illustrated in FIG. 1, a steering device 2 of a steer-by-wire type to be controlled by a steering control device 1 includes a steering portion 3 that is operated by a driver, and a steered portion 5 that steers steered wheels 4 in accordance with an operation on the steering portion 3 by the driver.

The steering portion 3 includes a steering shaft 12 to which a steering wheel 11 is fixed, and a steering-side actuator 13 that can apply a steering reaction force to the steering shaft 12. The steering-side actuator 13 includes a steering-side motor 14 that serves as a drive source, and a steering-side speed reducer 15 that transfers rotation of the steering-side motor 14 to the steering shaft 12 with the speed of the rotation reduced.

The steered portion 5 includes a first pinion shaft 21 that serves as a rotary shaft that enables conversion into a steered angle of the steered wheels 4, a rack shaft 22 coupled to the first pinion shaft 21, and a rack housing 23 that houses the rack shaft 22 so as to be reciprocally movable. The first pinion shaft 21 and the rack shaft 22 are disposed with a predetermined crossing angle. First pinion teeth 21a formed on the first pinion shaft 21 and first rack teeth 22a formed on the rack shaft 22 are meshed with each other to constitute a first rack-and-pinion mechanism 24. One end side of the rack shaft 22 in the axial direction is supported by the first rack-and-pinion mechanism 24 so as to be reciprocally movable. Tie rods 26 are coupled to both ends of the rack shaft 22 via rack ends 25 which are ball joints. The distal ends of the tie rods 26 are coupled to knuckles (not illustrated) to which the steered wheels 4 are assembled.

In addition, the steered portion 5 is provided, via a second pinion shaft 32, with a steered-side actuator 31 that applies a steered force for steering the steered wheels 4 to the rack shaft 22. The steered-side actuator 31 includes a steered-side motor 33 that serves as a drive source, and a steered-side speed reducer 34 that transfers rotation of the steered-side motor 33 to the second pinion shaft 32 with the speed of the rotation reduced. The second pinion shaft 32 and the rack shaft 22 are disposed with a predetermined crossing angle. Second pinion teeth 32a formed on the second pinion shaft 32 and second rack teeth 22b formed on the rack shaft 22 are meshed with each other to constitute a second rack-and-pinion mechanism 35. The other end side of the rack shaft 22 in the axial direction is supported by the second rack-and-pinion mechanism 35 so as to be reciprocally movable.

In the thus configured steering device 2, the second pinion shaft 32 is rotationally driven by the steered-side actuator 31 in accordance with a steering operation by the driver, and rotation of live second pinion shaft 32 is converted into movement of the rack shaft 22 in the axial direction by the second rack-and-pinion mechanism 35 to change the steered angle of the steered wheels 4. At this time, a steering reaction force that resists the steering operation by the driver is applied from the steering-side actuator 13 to the steering wheel 11.

Next, the electrical configuration of the present embodiment will be described.

The steering control device 1 is connected to the steering-side actuator 13 (steering-side motor 14) and the steered-side actuator 31 (steered-side motor 33) to control operation thereof. The steering control device 1 includes a central processing unit (CPU) and a memory (not illustrated), and various types of control are executed with the CPU executing a program stored in the memory in predetermined computation cycles.

A vehicle speed sensor 41 that detects a vehicle speed V of the vehicle and a torque sensor 42 that detects steering torque Th applied to the steering shaft 12 are connected to the steering control device 1. The torque sensor 42 is provided on the steering shaft 12 on the steering wheel 11 side with respect to a portion at which the steering shaft 12 is coupled to the steering-side actuator 13 (steering-side speed reducer 15). A steering-side rotation sensor 43 that detects a rotational angle θs of the steering-side motor 14 as a detection value that indicates the steering amount of the steering portion 3 as a relative angle in the range of 360° and a steered-side rotation sensor 44 that detects a rotational angle θt of the steered-side motor 33 as a detection value that indicates the steered amount of the steered portion 5 as a relative angle are also connected to the steering control device 1. In addition, a yaw rate sensor 45 that detects a yaw rate γ of the vehicle and a lateral acceleration sensor 46 that detects a lateral acceleration LA of the vehicle are connected to the steering control device 1. The steering torque Th and the rotational angles θs and θt are each detected as a positive value in the case where the vehicle is steered in a first direction (rightward in the present embodiment), and as a negative value in the case where the vehicle is steered in a second direction (leftward in the present embodiment). The steering control device 1 controls operation of the steering-side motor 14 and the steered-side motor 33 on the basis of such various state amounts.

Figure 2:
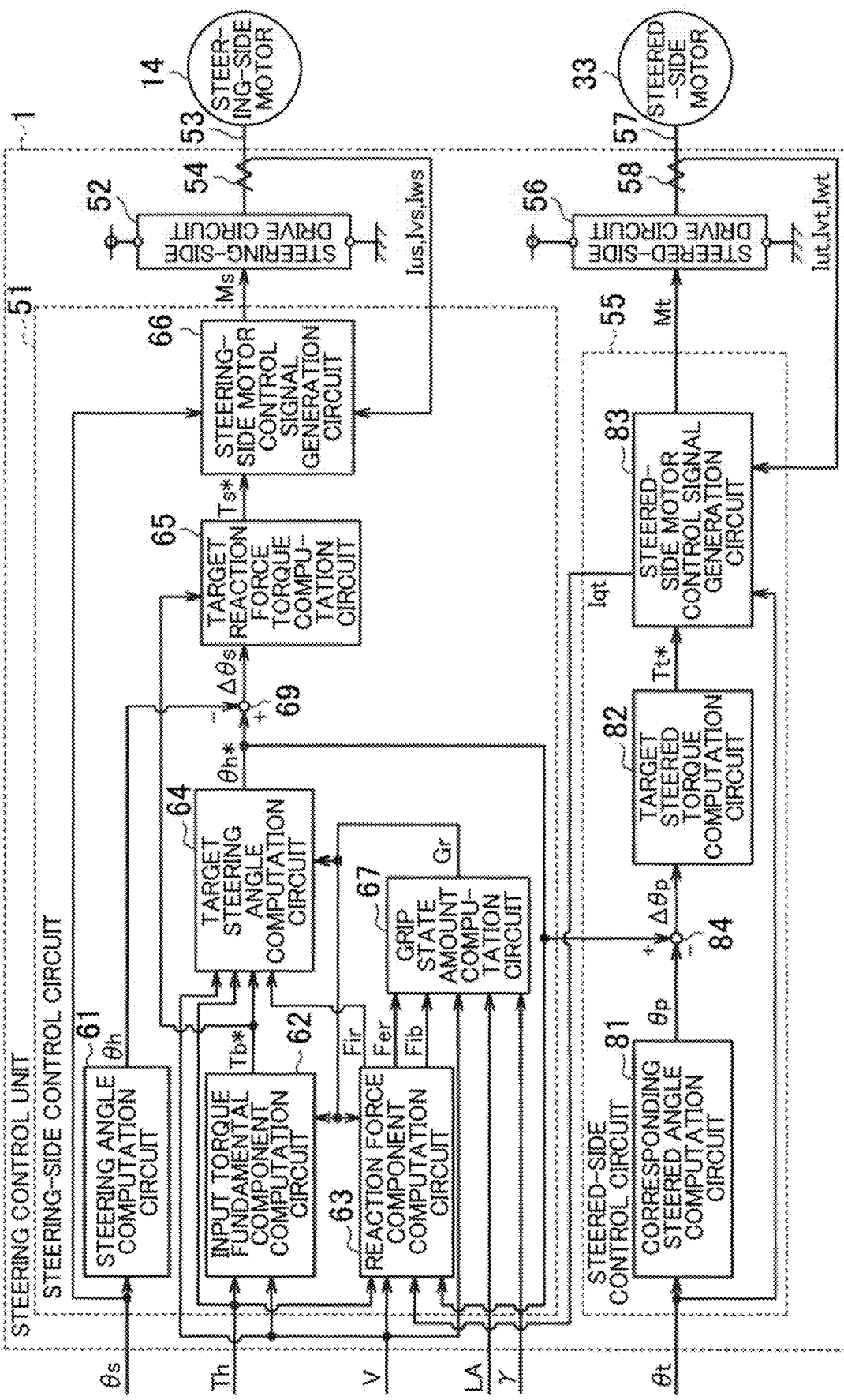
FIG. 2 is a block diagram of a steering control device according to the first embodiment.

The configuration of the steering control device 1 will be described in detail below. As illustrated in FIG. 2, the steering control device 1 includes a steering-side control circuit 51 which is a control circuit that outputs a steering-side motor control signal Ms, and a steering-side drive circuit 52 that supplies drive electric power to the steering-side motor 14 on the basis of the steering-side motor control signal Ms. Current sensors 54 that detect phase current values Ius, Ivs, and Iws of the steering-side motor 14 that flow through connection lines 53 between the steering-side drive circuit 52 and motor coils of the steering-side motor 14 for respective phases are connected to the steering-side control circuit 51. In FIG. 2, for convenience of illustration, the connection lines 53 for the respective phases and the current sensors 54 for the respective phases are illustrated collectively.

The steering control device 1 also includes a steered-side control circuit 55 that outputs a steered-side motor control signal Mt, and a steered-side drive circuit 56 that supplies drive electric power to the steered-side motor 33 on the basis of the steered-side motor control signal Mt. Current sensors 58 that detect phase current values Iut, Ivt, and Iwt of the steered-side motor 33 that flow through connection lines 57 between the steered-side drive circuit 56 and motor coils of the steered-side motor 33 for respective phases are connected to the steered-side control circuit 55. In FIG. 2, for convenience of illustration, the connection lines 57 for the respective phases and the current sensors 58 for the respective phases are illustrated collectively. The steering-side drive circuit 52 and the steered-side drive circuit 56 according to the present embodiment adopt a well-known pulse width modulation (PWM) inverter that has a plurality of switching elements (such as field effect transistors (FETs), for example). The steering-side motor control signal Ms and the steered-side motor control signal Mt are each a gate on/off signal that prescribes the on/off state of each of the switching elements.

The steering control device 1 generates the steering-side motor control signal Ms and the steered-side motor control signal Mt by executing various computation processes indicated by the following various control blocks in predetermined computation cycles. When the steering-side motor control signal Ms and the steered-side motor control signal Mt are output to the steering-side drive circuit 52 and the steered-side drive circuit 56, respectively, the switching elements are turned on and off so that drive electric power is supplied to the steering-side motor 14 and the steered-side motor 33. Consequently, operation of the steering-side actuator 13 and the steered-side actuator 31 is controlled.

First, the configuration of the steering-side control circuit 51 will be described. The steering-side control circuit 51 receives, as inputs, the vehicle speed V, the steering torque Th, the rotational angle θs, the lateral acceleration LA, the yaw rate γ, the phase current values Ius, Ivs, and Iws, and a q-axis current value Iqt. The steering-side control circuit 51 generates the steering-side motor control signal Ms on the basis of such state amounts, and outputs the generated signal.

Particularly, the steering-side control circuit 51 includes a steering angle computation circuit 61 that computes a steering angle θh of the steering wheel 11 on the basis of the rotational angle θs of the steering-side motor 14. The steering-side control circuit 51 also includes an input torque fundamental component computation circuit 62 that computes an input torque fundamental component Tb* which is a force that rotates the steering wheel 11, and a reaction force component computation circuit 63 that computes a reaction force component Fir which is a force that resists relation of the steering wheel 11. The steering-side control circuit 51 also includes a target steering angle computation circuit 64 that computes a target steering angle θh* on the basis of the vehicle speed V, the steering torque Th, the input torque fundamental component Tb*, and the reaction force component Fir. The steering-side control circuit 51 also includes a target reaction force torque computation circuit 65 that computes target reaction force torque Ts* on the basis of the steering angle θh and the target steering angle θh*, and a steering-side motor control signal generation circuit 66 that generates the steering-side motor control signal Ms on the basis of the target reaction force torque Ts*. The steering-side control circuit 51 further includes a grip state amount computation circuit 67 that computes a grip state amount Gr.

The steering angle computation circuit 61 acquires the input rotational angle θs converted into an absolute angle in a range exceeding 360° by counting the number of rotations of the steering-side motor 14 from the steering neutral position, for example. The steering angle computation circuit 61 computes the steering angle θh by multiplying the rotational angle, which has been converted into an absolute angle, by a conversion coefficient Ks based on the rotational speed ratio of the steering-side speed reducer 15.

Figure 3:
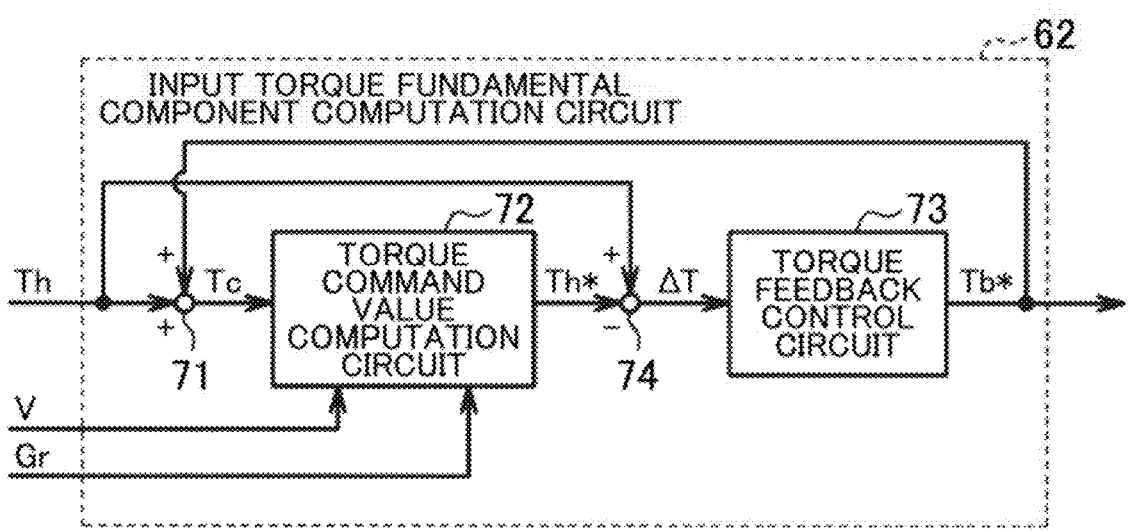
FIG. 3 is a block diagram of an input torque fundamental component computation circuit according to the first embodiment.

The input torque fundamental component computation circuit 62 receives, as inputs, the steering torque Th, the vehicle speed V, and the grip state amount Gr. As illustrated in FIG. 3, the input torque fundamental component computation circuit 62 includes an adder 71 that receives, as an input, the input torque fundamental component Tb* together with the steering torque Th, and the adder 71 adds such components to compute drive torque Tc. The input torque fundamental component computation circuit 62 also includes a torque command value computation circuit 72 that computes a torque command value Th* corresponding to a target value for the steering torque Th that should be input by the driver for the drive torque Tc. The input torque fundamental component computation circuit 62 also includes a torque feedback control circuit (hereinafter referred to as "torque F/B control circuit") 73 that computes an input torque fundamental component through execution of torque feedback control for causing the steering torque Th to follow the torque command value Th*.

The torque command value computation circuit 72 receives, as inputs, the drive torque Tc, the vehicle speed V, and the grip state amount Gr. The torque command value computation circuit 72 computes the torque command value Th* on the basis of such state amounts as discussed later, and outputs the computed value to a subtractor 74. The subtractor 74 receives, as an input, the steering torque Th in addition to the torque command value Th*. The torque F/B control circuit 73 receives, as an input, a torque deviation ΔT obtained by the subtractor 74 subtracting the torque command value Th* from the steering torque Th. The torque F/B control circuit 73 computes the input torque fundamental component Tb*, which is a control amount for performing feedback control so as to bring the steering torque Th to the torque command value Th*, on the basis of the torque deviation ΔT. Specifically, the torque F/B control circuit 73 computes the input torque fundamental component Tb* as the sum of respective output values from a proportional element, an integral element, and a differential element that receive the torque deviation ΔT as an input.

As illustrated in FIG. 2, the target steering angle computation circuit 64 receives, as inputs, the reaction force component Fir which is computed by the reaction force component computation circuit 63 and the grip state amount Gr which is computed by the grip state amount computation circuit 67 as discussed later in addition to the steering, torque Th, the vehicle speed V, and the input torque fundamental component Tb*. The target steering angle computation circuit 64 computes the target steering angle θh* utilizing a model (steering model) formula that correlates input torque Tin*, which is a value obtained by adding the steering torque Th to the input torque fundamental component Tb* and subtrating the reaction force component Fir therefrom, and the target steering angle θh*. The model formula defines and represents the relationship between torque and the rotational angle of a rotary shaft that is rotated along with rotation of the steering wheel 11 in a system in which the steering wheel 11 (steering portion 3) and the steered wheels 4 (steered portion 5) are mechanically coupled to each other. The model formula is represented using a viscosity coefficient C obtained by modeling the friction etc. of the steering device 2 and an inertia coefficient J obtained by modeling the inertia of the steering device 2. The viscosity coefficient C and the inertia coefficient J are set so as to be variable in accordance with the vehicle speed V. The target steering angle θh* which is computed using the model formula in this manner is output to the reaction force component computation circuit 63 in addition to a subtractor 69 and the steered-side control circuit 55.

The target reaction force torque computation circuit 65 receives, as an input, an angle deviation Δθs obtained by the subtractor 69 subtracting the steering angle θh from the target steering angle θh* in addition to the input torque fundamental component Tb*. The target reaction force torque computation circuit 65 computes fundamental reaction force torque, which is the base of a steering reaction force applied by the steering-side motor 14 as a control amount for performing feedback control so as to bring the steering angle θh to the target steering angle θh*, on the basis of the angle deviation Δθs, and computes the target reaction force torque Ts* by adding the input torque fundamental component Tb* to the fundamental reaction force torque. Specifically, the target reaction force torque computation circuit 65 computes the fundamental reaction force torque as the sum of respective output values from a proportional element, an integral element, and a differential element that receive the angle deviation Δθs as an input.

The steering-side motor control signal generation circuit 66 receives, as inputs, the rotational angle θs and the phase current values Ius, Ivs, and Iws in addition to the target reaction force torque Ts*. The steering-side motor control signal generation circuit 66 according to the present embodiment computes a q-axis target current value Iqs* on the q-axis in the d/q coordinate system on the basis of the target reaction force torque Ts*. In the present embodiment, a d-axis target current value Ids* on the d-axis is set to zero.

The steering-side motor control signal generation circuit 66 generates (computes) the steering-side motor control signal Ms to be output to the steering-side drive circuit 52 by executing current feedback control in the d/q coordinate system. Specifically, the steering-side motor control signal generation circuit 66 computes a d-axis current value Ids and a q-axis current value Iqs, which are actual current values of the steering-side motor 14 in the d/q coordinate system, by mapping the phase current values Ius, Ivs, and Iws onto the d/q coordinate on the basis of the rotational angle θs. The steering-side motor control signal generation circuit 66 computes a voltage command value on the basis of current deviations on the d-axis and the q-axis, and generates the steering-side motor control signal Ms which has a duty ratio based on the voltage command value, in order to cause the d-axis current value Ids to follow the d-axis target current value Ids* and cause the q-axis current value Iqs to follow the q-axis target current value Iqs*. With the thus computed steering-side motor control signal Ms output to the steering-side drive circuit 52, drive electric power that matches the steering-side motor control signal Ms is output to the steering-side motor 14 to control operation thereof.

Next, the steered-side control circuit 55 will be described. The steered-side control circuit 55 receives, as inputs, the rotational angle θt, the target steering angle θh*, and the phase current values Iut, Ivt, and Iwt of the steered-side motor 33. The steered-side control circuit 55 generates the steered-side motor control signal Mt on the basis of such state amounts, and outputs the generated signal.

Particularly, the steered-side control circuit 55 includes a corresponding steered angle computation circuit 81 that computes a corresponding steered angle θp corresponding to the rotational angle (pinion angle) of the first pinion shaft 21, which is a rotary shaft that enables conversion into the steered angle of the steered wheels 4. The steered-side control circuit 55 also includes a target steered torque computation circuit 82 that computes target steered torque Tt* on the basis of the corresponding steered angle θp and the target steering angle θh*, and a steered-side motor control signal generation circuit 83 that generates the steered-side motor control signal Mt on the basis of the target steered torque Tt*. In the steering device 2 according to the present embodiment, the steering angle ratio, which is the ratio between the steering angle θh and the corresponding steered angle θp, is set to be constant, and a target corresponding steered angle is equal to the target steering angle θh*.

The corresponding steered angle computation circuit 81 acquires the input rotational angle fit converted into an absolute angle in a range exceeding 36° by counting the number of rotations of the steered-side motor 33 from the neutral position at which the vehicle travels straight, for example. The corresponding steered angle computation circuit 81 computes the corresponding steered angle θp by multiplying the rotational angle, which has been converted into an absolute angle, by a conversion coefficient Kt based on the rotational speed ratio of the steered-side speed reducer 34 and the rotational speed ratio of the first and second rack-and-pinion mechanisms 24 and 35. That is, the corresponding steered angle θp corresponds to the steering angle θh of the steering wheel 11 for a case where it is assumed that the first pinion shaft 21 is coupled to the steering shaft 12.

The target steered torque computation circuit 82 receives, as an input, an angle deviation Δθp obtained by a subtractor 84 subtracting the corresponding steered angle θp from the target steering angle θh* (target corresponding steered angle). The target steered torque computation circuit 82 computes the target steered torque Tt*, which is a target value for a steered force applied by the steered-side motor 33, as a control amount for performing feedback control so as to bring the corresponding steered angle θp to the target steering angle θh*, on the basis of the angle deviation Δθp. Specifically, the target steered torque computation circuit 82 computes the target steered torque Tt* as the sum of respective output values from a proportional element, an integral element, and a differential element that receive the angle deviation Δθp as an input.

The steered-side motor control signal generation circuit 83 receives, as inputs, the rotational angle θt and the phase current values Iut, Ivt, and Iwt in addition to the target steered torque Tt*. The steered-side motor control signal generation circuit 83 computes a q-axis target current value Iqt* on the q-axis in the d/q coordinate system on the basis of the target steered torque Tt*. In the present embodiment, a d-axis target current value Idt* on the d-axis is set to zero.

The steered-side motor control signal generation circuit 83 generates (computes) the steered-side motor control signal Mt to be output to the steered-side drive circuit 56 by executing current feedback control in the d/q coordinate system. Specifically, the steered-side motor control signal generation circuit 83 computes a d-axis current value Ids and a q-axis current value Iqs, which are actual current values of the steered-side motor 33 in the d/q coordinate system, by mapping the phase current values Iut, Ivt, and Iwt onto the d/q coordinate on the basis of the rotational angle θt. The steered-side motor control signal generation circuit 83 computes a voltage command value on the basis of current deviations on the d-axis and the q-axis, and generates the steered-side motor control signal Mt which has a duty ratio based on the voltage command value, in order to cause the d-axis current value Idt to follow the d-axis target current value Idt* and cause the q-axis current value Iqt to follow the q-axis target current value Iqt*. With the thus computed sleeted-side motor control signal Mt output to the steered-side drive circuit 56, drive electric power that matches the steered-side motor control signal Mt is output to the steered-side motor 33 to control operation thereof. The q-axis current value Iqt which is computed in the course of generating the steered-side motor control signal Mt is output to the reaction force component computation circuit 63.

Next, the configuration of the reaction force component computation circuit 63 will be described. The reaction force component computation circuit 63 receives, as inputs, the vehicle speed V, the steering torque Th, the q-axis current value Iqt of the steered-side motor 33, and the target steering angle θh*. The reaction force component computation circuit 63 computes the reaction force component Fir (base reaction force), which matches an axial force that acts on the rack shaft 22, on the basis of such state amounts, and outputs the computed component to the target steering angle computation circuit 64.

Figure 4:
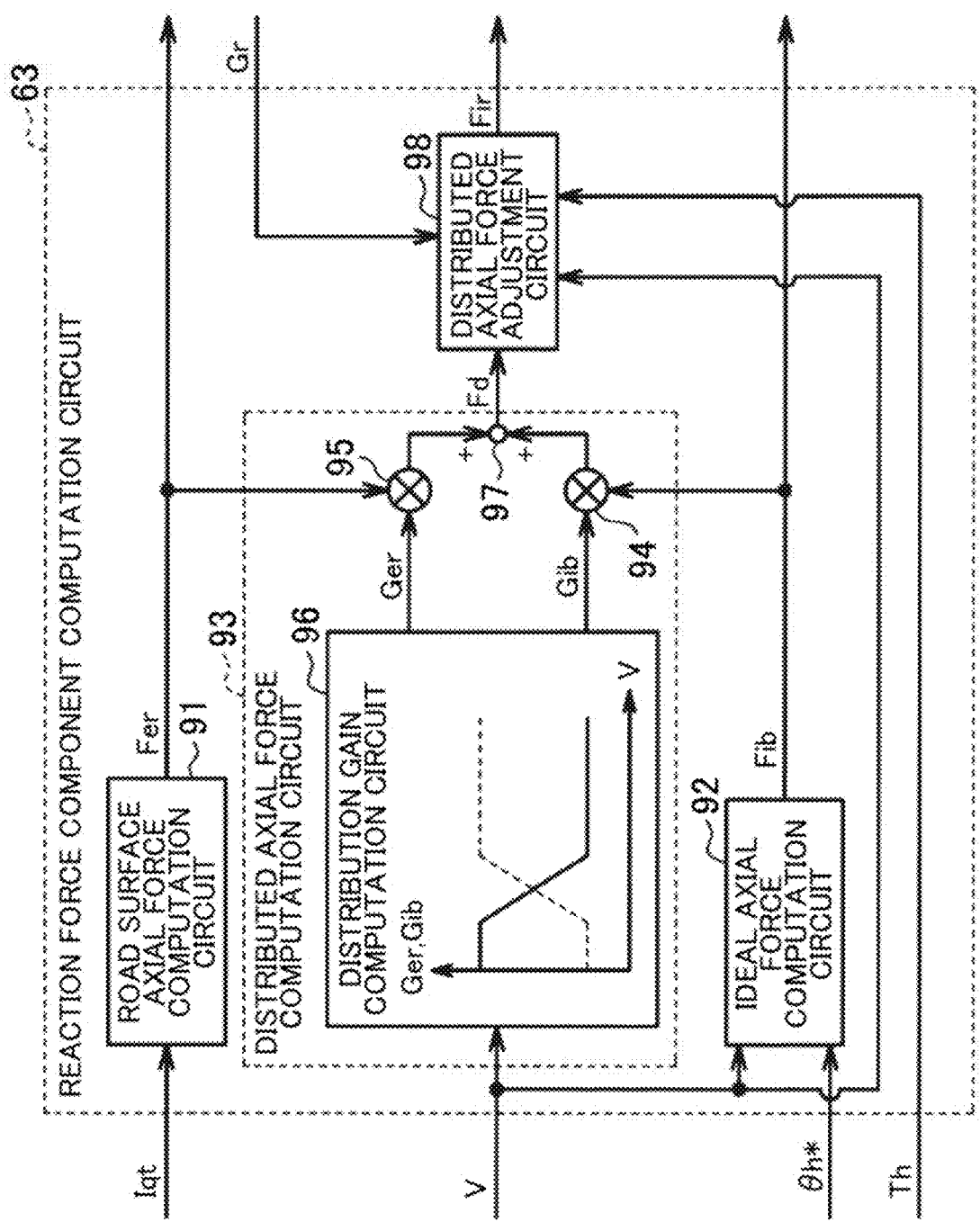
FIG. 4 is a block diagram of a reaction force component computation circuit according to the first embodiment.

As illustrated in FIG. 4, the reaction force component computation circuit 63 includes a road surface axial force computation circuit 91 which is an axial force computation circuit that computes a road surface axial force Fer, and an ideal axial force computation circuit 92 which is an axial force computation circuit that computes an ideal axial force Fib. The road surface axial force Fer and the ideal axial force Fib are computed in the dimension (N·m) of torque. The reaction force component computation circuit 63 also includes a distributed axial force computation circuit 93 that computes a distributed axial force Fd by distributing the ideal axial force Fib and the road surface axial force Fer at predetermined proportions such that an axial force (road surface information transferred from the road surface) applied from the road surface to the steered wheels 4 is reflected.

The ideal axial force computation circuit 92 receives, as inputs, the target steering angle θh* (target corresponding steered angle) and the vehicle speed V. The ideal axial force computation circuit 92 computes the ideal axial force Fib, which is an ideal value of an axial force (force transferred to the steered wheels 4) that acts on the steered wheels 4 and in which the load surface information is not reflected, on the basis of the target steering angle θh*. Specifically, the ideal axial force computation circuit 92 computes the ideal axial force Fib such that the absolute value thereof becomes larger as the absolute value of the target steering angle θh* becomes larger. In addition, the ideal axial force computation circuit 92 computes the ideal axial force Fib such that the absolute value thereof becomes larger as the vehicle speed V becomes higher. The thus computed ideal axial force Fib is output to a multiplier 94 and the grip state amount computation circuit 67.

The road surface axial force computation circuit 91 receives, as an input, the q-axis current value Iqt of the steered-side motor 33. The road surface axial force computation circuit 91 computes the road surface axial force Fer, which is an estimated value of an axial force (force transferred to the steered wheels 4) that acts on the steered wheels 4 and in which the road surface information is reflected, on the basis of the q-axis current value Iqt. Specifically, the road surface axial force computation circuit 91 computes the road surface axial force Fer such that the absolute value thereof becomes larger as the absolute value of the q-axis current value Iqt becomes larger on the assumption that torque applied to the rack shaft 22 by the steered-side motor 33 and torque that matches a force applied from the road surface to the steered wheels 4 are balanced with each other. The thus computed road surface axial force Fer is output to a multiplier 95 and the grip state amount computation circuit 67.

The distributed axial force computation circuit 93 receives, as inputs, the road surface axial force Fer and the ideal axial force Fib in addition to the vehicle speed V. The distributed axial force computation circuit 93 includes a distribution gain computation circuit 96 that computes a distribution gain Gib and a distribution gain Ger, which are respective distribution proportions for distributing the ideal axial force Fib and the road surface axial force Fer, on the basis of the vehicle speed V. The distribution gain computation circuit 96 according to the present embodiment includes a map that defines the relationship between the vehicle speed V and the distribution gains Gib and Ger, and computes the distribution gains Gib and Ger which matches the vehicle speed V by referencing the map. The distribution gain Gib has a small value in the case where the vehicle speed V is higher compared to that is the case where the vehicle speed V is lower. The distribution gain Ger has a large value in the case where the vehicle speed V is higher compared to that in the case where the vehicle speed V is lower. In the present embodiment, the values of the distribution gains Gib and Ger are set such that the sum thereof is "1". The thus computed distribution gain Gib is output to the multiplier 94. The distribution gain Ger is output to the multiplier 95.

The distributed axial force computation circuit 93 computes the distributed axial force Fd by the multiplier 94 multiplying the ideal axial force Fib by the distribution gain Gib, the multiplier 95 multiplying the road surface axial force Fer by the distribution gain Ger, and an adder 97 adding such values. The thus computed distributed axial force Fd is output to a distributed axial force adjustment circuit 98 to be discussed later. The distributed axial force Fd which is adjusted by the distributed axial force adjustment circuit 98 is output to the target steering angle computation circuit 64 as the reaction force component Fir.

Next, the grip state amount computation circuit 67 will be described.

As illustrated in FIG. 2, the grip state amount computation circuit 67 receives, as inputs, the ideal axial force Fib, the road surface axial force Fer, the vehicle speed V, the yaw rate γ, and the lateral acceleration LA. The grip state amount computation circuit 67 computes the grip state amount Gr on the basis of such state amounts.

Figure 5:
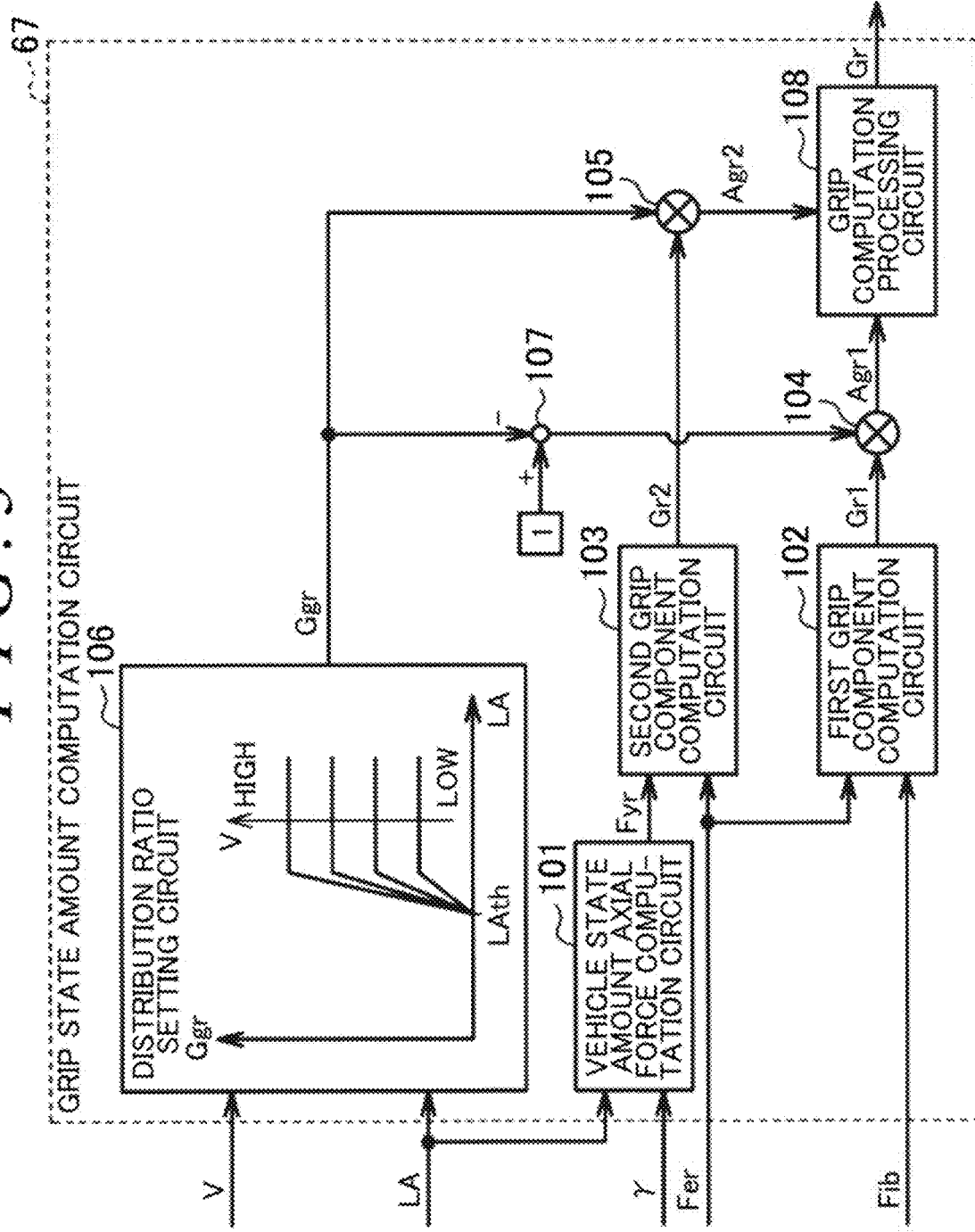
FIG. 5 is a block diagram of a grip state amount computation circuit according to the first embodiment.

Particularly, as illustrated in FIG. 5, the grip state amount computation circuit 67 includes a vehicle state amount axial force computation circuit 101 which is an axial force computation section that computes a vehicle state amount axial force Fyr. The vehicle state amount axial force Fyr is computed in the dimension (N·m) of torque. The vehicle state amount axial force computation circuit 101 receives, as inputs, the yaw rate γ and the lateral acceleration LA which are vehicle state amounts. The vehicle state amount axial force computation circuit 101 computes a lateral force Fy by inputting the yaw rate γ and the lateral acceleration LA to the following formula (1).

$$\text{Lateral force } Fy = Kla \times \text{lateral acceleration } LA + K\gamma \times \gamma' \quad (1)$$

"γ'" is a differential value of the yaw rate γ. "Kla" and "Kγ" are coefficients set in advance through tests or the like. The vehicle state amount axial force computation circuit 101 outputs the lateral force Fy as the vehicle state amount axial force Fyr in the light of the fact that the thus computed lateral force Fy can be approximately considered as an axial force that acts on the rack shaft 22.

Figure 6:
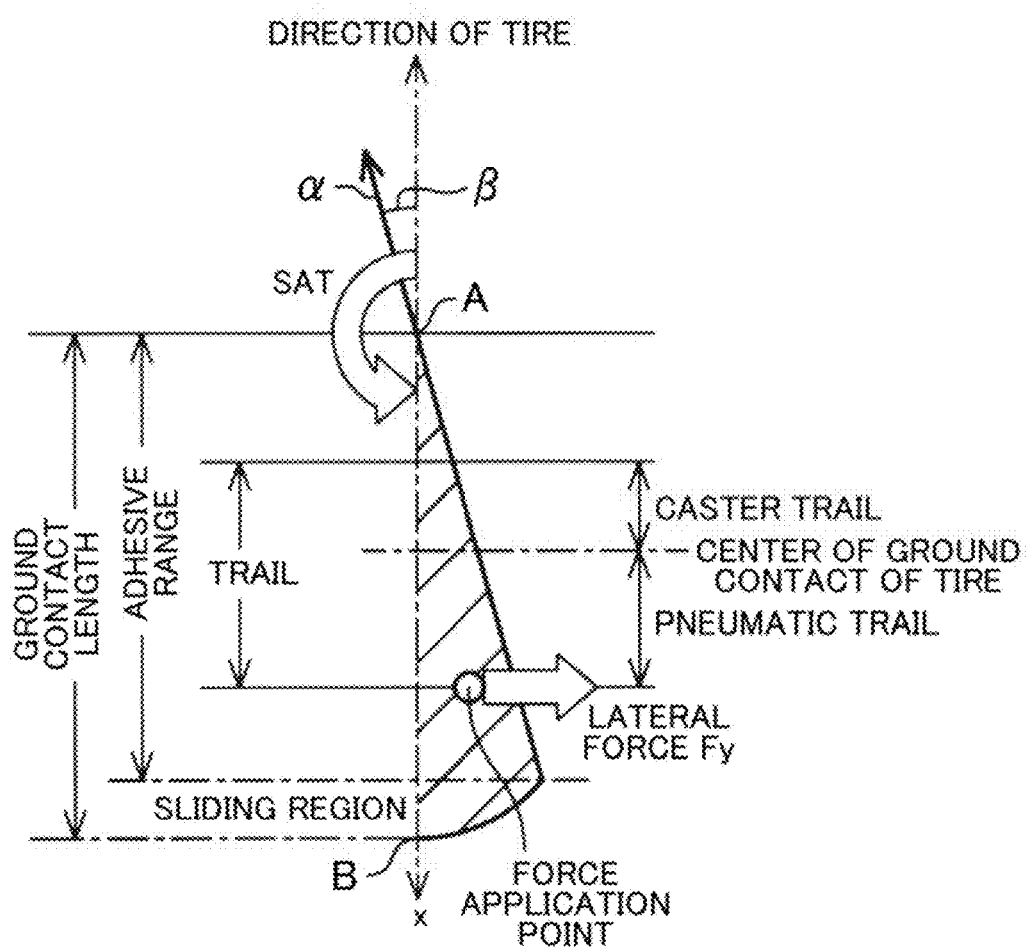
FIG. 6 is a schematic diagram illustrating the relationship among a lateral force that acts on a force application point, self-aligning torque, and a pneumatic trail.

The relationship between a slip angle β of a steered wheel and a force that acts on the steered wheel will be described with reference to FIGS. 6 and 7. FIG. 6 illustrates the ground contact surface of the steered wheel at the slip angle β as viewed from the top. A central line x directed along the steered wheel indicates the original direction of the steered wheel. In contrast, the advancing direction of the steered wheel is indicated by a line α. In the drawing, if the point A is defined as the ground contact start point of the steered wheel and the point B is defined as the ground contact end point, the tread surface is dragged on the road surface by the slip angle β to be warped along the line α from the central line x. In FIG. 6, a region in which the tread surface is dragged to be warped is hatched. Of the warped region, a region on the A point side is a viscous region, and a region on the B point side is a sliding region. The lateral force Fy acts on a force application point on the ground contact surface of the steered wheel when the steered wheel is turned at the slip angle β, and a moment about the vertical axis acts as self-aligning torque SAT. The distance between the center of ground contact of the steered wheel and the force application point is defined as the pneumatic trail, and the sum of the pneumatic trail and the caster trait is defined as the trail.

Figure 7:
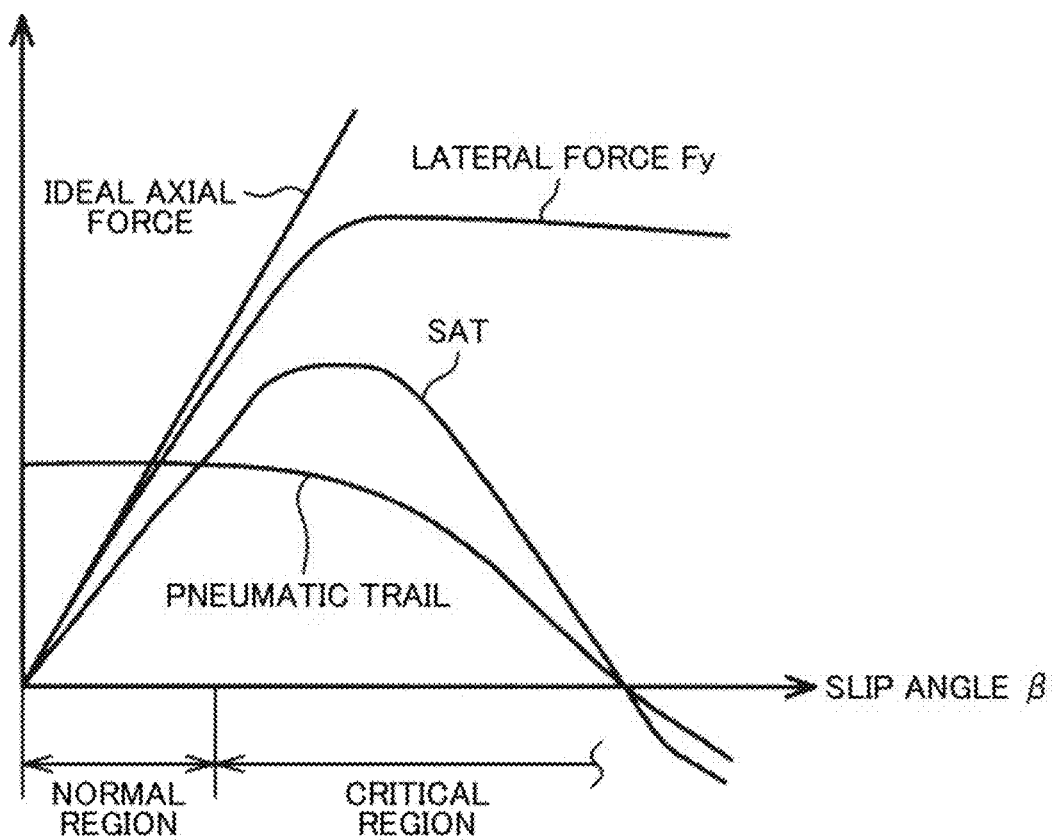
FIG. 7 is a graph indicating variations in ideal axial force, lateral force (vehicle state amount axial force), self-aligning torque (road surface axial force), and pneumatic trail with respect to variations in slip angle.

FIG. 7 illustrates variations in the ideal axial force Fib, the lateral force Fy (vehicle state amount axial force Fyr), the self-aligning torque SAT (road surface axial force Fer), and the pneumatic trail with respect to variations in the slip angle β. In the steered wheel during a turn, as indicated in the drawing, in a region in which the slip angle β is small, the ideal axial force Fib, the lateral force Fy, and the self-aligning torque SAT are increased generally linearly along with an increase in the slip angle β, and there is a small difference among such values. In a region in which the slip angle β is large to a certain degree, on the other hand, the ideal axial force Fib continues to increase generally linearly, but the lateral force Fy becomes generally constant or is slightly decreased after being increased, along with an increase in the slip angle β. Meanwhile, the self-aligning torque SAT is increased for some time along with an increase in the slip angle β, but is significantly decreased along with a decrease in the pneumatic trail. Thus, a region in which such values are varied generally linearly and there is a small difference among such values is referred to as a "normal region", and a region in which the lateral force Fy and the self-aligning torque SAT are varied non-linearly and there is a large difference among such values is referred to as a "critical region". The boundary between the normal region and the critical region indicated in FIG. 7 is determined for convenience.

If the axial force during a turn is taken as the self-aligning torque SAT, the relationship between the self-aligning torque SAT and the lateral force Fy can be expressed by the following formula (2) which uses a parameter corresponding to the pneumatic trail from the center of ground contact between the steered wheel and the road surface to the force application point of the lateral force illustrated in FIG. 6.

$$\text{Self-aligning torque } SAT = \text{lateral force } Fy \times \text{pneumatic trait} \qquad (2)$$

If the self-aligning torque SAT is considered as "axial force≈reaction force from road surface", the road surface axial force Fer which is based on a drive current (i.e. the q-axis current value Iqt) of the steered-side motor 33 is considered to approximately express the self-aligning torque SAT.

In addition, the lateral force Fy is a force generated in the steered wheel 4, and can be approximately expressed using the lateral acceleration LA on the basis of "lateral force Fy≈force generated in lateral direction of vehicle". With the lateral acceleration LA alone, the response at the start of movement is insufficient for the actual axial force. Therefore, a differential of the yaw rate γ is added in order to improve the response, obtaining the above formula (1). From the above formula (2), the grip state amount Gr which is a grip level that indicates how much the steered wheel 4 grips the road surface can be represented by the following formula (3).

$$\text{Grip state amount } Gr = \text{self-aligning torque } SAT / \text{lateral force } Fy \qquad (3)$$

The grip state amount Gr can be represented by the following formula (4) in the light of the fact that the road surface axial force Fer can approximately express the self-aligning torque SAT and the vehicle state amount axial force Fyr can approximately express the lateral force.

$$\text{Grip state amount } Gr = (Ker \times \text{road surface axial force})/(Ky \times \text{vehicle state amount axial force}) \qquad (4)$$

"Ker" and "Ky" are coefficients set in advance through tests or the like. The vehicle state is varied in accordance with the travel state of the vehicle. Therefore, an axial force that actually acts on the rack shaft 22 in the case where the behavior of the vehicle is varied significantly can be estimated accurately using the vehicle state amount axial force Fyr, which is based on the yaw rate γ and the lateral acceleration LA, compared to the ideal axial force Fib. In the case where the vehicle is in a low-speed state including a stationary state, however, the yaw rate γ and the lateral acceleration LA have small values, and therefore noise is relatively large for output values from the yaw rate sensor 45 and the lateral acceleration sensor 46. In this case, the axial force cannot be detected precisely using the yaw rate γ and the lateral acceleration LA, compared to the target steering angle θh*.

In the light of the above as illustrated in FIG. 5, the grip state amount computation circuit 67 according to the present embodiment includes a first grip component computation circuit 102 that computes a first grip component Gr1 based on the ideal axial force Fib and the road surface axial force Fer, and a second grip component computation circuit 103 that computes a second grip component Gr2 based on the vehicle state amount axial force Fyr and the road surface axial force Fer. In the case where the vehicle speed V and the lateral acceleration LA which are travel state amounts that indicate the travel state of the vehicle indicate a low-speed state, the grip state amount computation circuit 67 computes the grip state amount Gr at a distribution ratio including the first grip component Gr1. In the case where the vehicle speed V and the lateral acceleration LA indicate a mid- to high-speed state, on the other hand, the grip state amount computation circuit 67 computes the grip state amount Gr at a distribution ratio including the second grip component Gr2.

Particularly, the first grip component computation circuit 102 receives, as inputs, the road surface axial force Fer and the ideal axial force Fib. The first grip component computation circuit 102 computes the first grip component Gr1 by dividing the road surface axial force Fer by the ideal axial force Fib, and outputs the computed component to a multiplier 104. In the case where the absolute value of the ideal axial force Fib is equal to or less than a zero threshold F0, the first grip component computation circuit 102 according to the present embodiment does not divide the road surface axial force Fer by the ideal axial force Fib, but outputs zero as the first grip component Gr1. That is, the first grip component computation circuit 102 has a zero division prevention function of preventing the first grip component Gr1 from diverging due to dividing the road surface axial force Fer by zero. The zero threshold F0 is set to a significantly small value that is close to zero. The second grip component computation circuit 103 receives, as inputs, the road surface axial force Fer and the vehicle state amount axial force Fyr. The second grip component computation circuit 103 computes the second grip component Gr2 by dividing the road surface axial force Fer by the vehicle state amount axial force Fyr, and outputs the computed component to a multiplier 105. The second grip component computation circuit 103 according to the present embodiment has a zero division prevention function, and does not perform a division but outputs zero as the second grip component Gr2 in the case where the absolute value of the vehicle state amount axial force Fyr is equal to or less than the zero threshold F0.

The grip state amount computation circuit 67 includes a distribution ratio setting circuit 106 that sets a distribution ratio Ggr between the first grip component Gr1 and the second grip component Gr2. The distribution ratio setting circuit 106 receives, as inputs, the vehicle speed V and the lateral acceleration LA. The distribution ratio setting circuit 106 includes a map such as that illustrated in FIG. 5, and sets the distribution ratio Ggr by referencing the map. In the map, the distribution ratio Ggr is set such that the ratio of the second grip component Gr2 becomes higher as the vehicle speed V and the lateral acceleration LA are brought closer from a value that indicates a low-speed state to a value that indicates a mid- to high-speed state.

Specifically, the distribution ratio Ggr is set such that the distribution ratio Ggr is zero in a region in which the lateral acceleration LA is equal to or less than a lateral acceleration threshold LAth, the distribution ratio Ggr becomes higher in accordance with an increase in the lateral acceleration LA when the lateral acceleration LA is higher than the lateral acceleration threshold LAth, and the distribution ratio Ggr becomes constant thereafter. In addition, the distribution ratio Ggr is set such that the distribution ratio Ggr is zero in a region in which the vehicle speed V is equal to or less than a vehicle speed threshold Vth and the distribution ratio Ggr becomes higher in accordance with an increase in the vehicle speed V when the vehicle speed V is higher than the vehicle speed threshold Vth. The maximum value of the distribution ratio Ggr is set to "1". The lateral acceleration threshold LAth and the vehicle speed threshold Vth are values that are large enough compared to noise to secure the sensor precision, and are set in advance through experiments or the like. The value of the lateral acceleration LA indicates that the travel state of the vehicle is a low-speed state in the case where the lateral acceleration LA is equal to or less than the lateral acceleration threshold LAth. The value of the lateral acceleration LA indicates that the travel state of the vehicle is a mid- to high-speed state in the case where the lateral acceleration LA is higher than the lateral acceleration threshold LAth. Similarly, the value of the vehicle speed V indicates that the travel state of the vehicle is a low-speed state in the case where the vehicle speed V is equal to or less than the vehicle speed threshold Vth. The value of the vehicle speed V indicates that the travel state of the vehicle is a mid- to high-speed state in the case where the vehicle speed V is higher than the vehicle speed threshold Vth.

The thus set distribution ratio Ggr is output to a subtractor 107 and the multiplier 105. The subtractor 107 always receives, as an input, a constant "1" in addition to the distribution ratio Ggr, and outputs a value obtained by subtracting the distribution ratio Ggr from the constant "1" to the multiplier 104. That is, the sum of the distribution ratio of the first grip component Gr1 and the distribution ratio of the second grip component Gr2 is set to "1".

The grip state amount computation circuit 67 outputs a value obtained by the multiplier 104 multiplying the first grip component Gr1 by the value (1−distribution ratio Ggr) which is output from the subtractor 107 to a grip computation processing circuit 108 as a first grip distribution amount Agr1. The grip state amount computation circuit 67 also outputs a value obtained by the multiplier 105 multiplying the second grip component Gr2 by the distribution ratio Ggr to the grip computation processing circuit 108 as a second grip distribution amount Agr2. The grip computation processing circuit 108 outputs a value obtained by adding the first grip distribution amount Agr1 and the second grip distribution amount Agr2 as the grip state amount Gr.

As illustrated in FIG. 2, the grip state amount Gr computed as described above is input to the input torque fundamental component computation circuit 62 (torque command value computation circuit 72), the reaction force component computation circuit 63 (distributed axial force adjustment circuit 98), and the target steering angle computation circuit 64.

Figure 8:
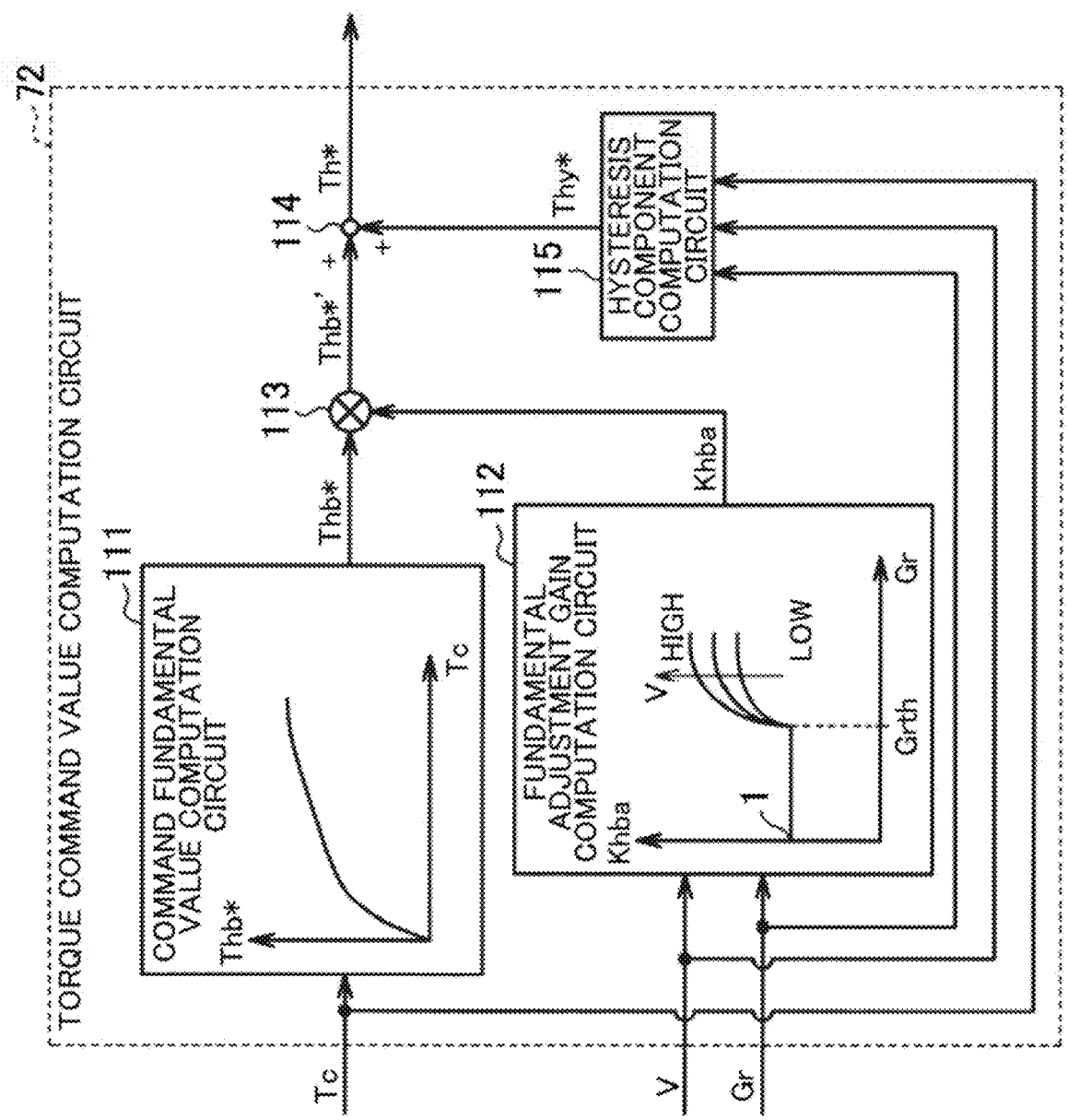
FIG. 8 is a block diagram of a torque command value computation circuit according to the first embodiment.

Next, the configuration of the torque command value computation circuit 72 will be described in detail. As is illustrated in FIG. 8, the torque command value computation circuit 72 includes a command fundamental value computation circuit 111 that computes a command fundamental value Thb*, which is the base of the torque command value Th*, on the basis of the drive torque Tc, and a fundamental adjustment gain computation circuit 112 that computes a fundamental adjustment gain Khba for adjusting the command fundamental value Thb*.

The command fundamental value computation circuit 111 receives the drive torque Tc as an input. The command fundamental value computation circuit 111 includes a map that defines the relationship between the drive torque Tc and the command fundamental value Thb*, and computes the command fundamental value Thb* which matches the drive torque Tc by referencing the map. The map is set such that the command fundamental value Thb* is increased non-linearly on the basis of an increase in the drive torque Tc. The thus computed command fundamental value Thb* is output to a multiplier 113.

The fundamental adjustment gain computation circuit 112 receives, as inputs, the grip state amount Gr and the vehicle speed V. The fundamental adjustment gain computation circuit 112 includes a map that defines the relationship between the grip state amount Gr and the vehicle speed V and the fundamental adjustment gain Khba, and computes the fundamental adjustment gain Khba which matches the grip state amount Gr and the vehicle speed V by referencing the map. The map is set such that the fundamental adjustment gain Khba is "1" in a region in which the grip state amount Gr is equal to or less than a grip threshold Grth and the fundamental adjustment gain Khba becomes higher on the basis of an increase in the grip state amount Gr when the grip state amount Gr is larger than the grip threshold Grth. The grip threshold Grth is a value that indicates the grip state amount Gr at the slip angle β at the boundary between the normal region and the critical region, and is set in advance through tests or the like. The map is also set such that the fundamental adjustment gain Khba becomes higher on the basis of an increase in the vehicle speed V in a region in which the grip state amount Gr is larger than the grip threshold Grth. The shape of the map is changeable as appropriate. The map may be set such that the fundamental adjustment gain Khba becomes lower on the basis of an increase in the grip state amount Gr, or the fundamental adjustment gain Khba becomes lower on the basis of an increase in the vehicle speed V, in a region in which the grip state amount Gr is larger than the grip threshold Grth. The thus computed fundamental adjustment gain Khba is output to the multiplier 113. In the torque command value computation circuit 72, the multiplier 113 computes a command fundamental value Thb*' as a value obtained by multiplying the command fundamental value Thb* by the fundamental adjustment gain Khba, and outputs the computed value to an adder 114.

Figure 9:
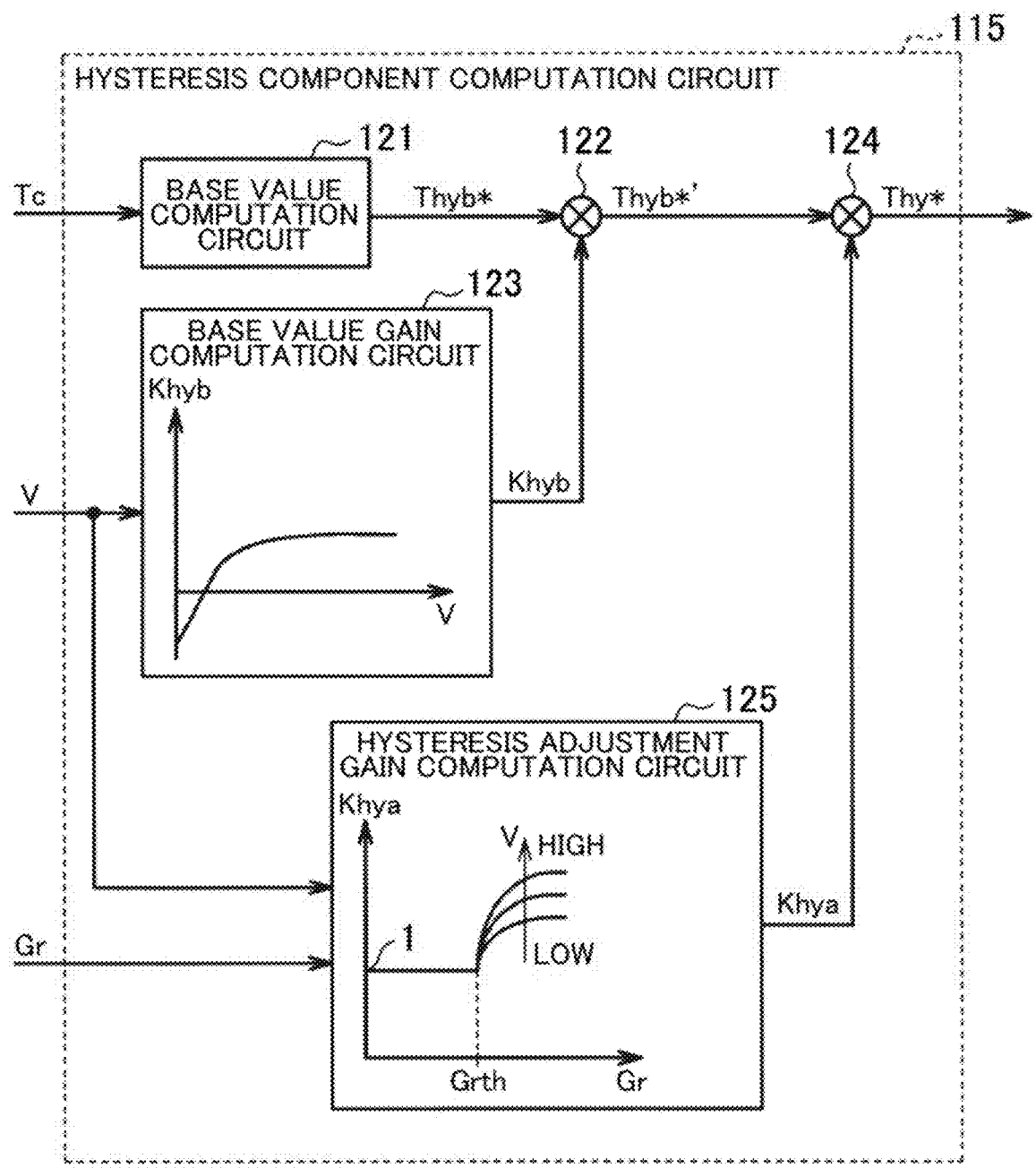
FIG. 9 is a block diagram of a hysteresis component computation circuit according to the first embodiment.

The torque command value computation circuit 72 also includes a hysteresis component computation circuit 115 that computes a hysteresis component Thy* to be added to the command fundamental value Thb*'. As illustrated in FIG. 9, the hysteresis component computation circuit 115 includes a base value computation circuit 121 that computes a base value Thyb*. The base value computation circuit 121 receives the drive torque Tc as an input. The base value computation circuit 121 computes the base value Thyb*, which has hysteresis characteristics that match the direction of the drive torque Tc, on the basis of the drive torque Tc.

Figure 10A:
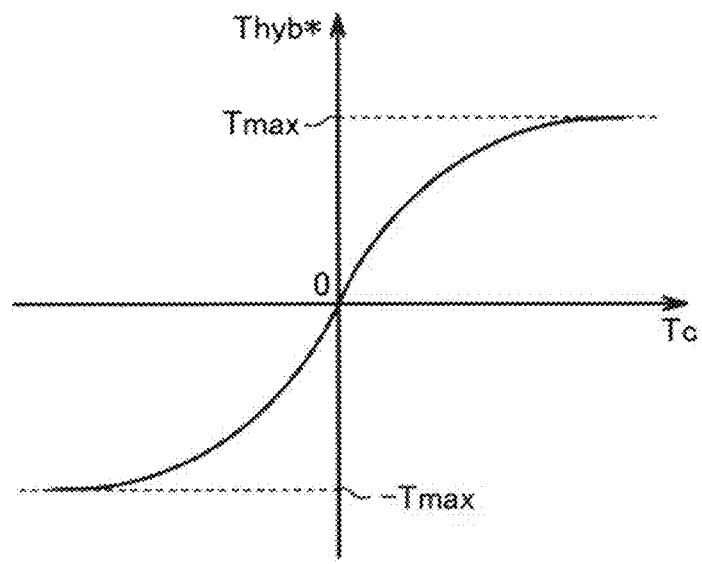
FIG. 10A is a graph illustrating the relationship between drive torque and a base value during a steering-forth operation.

Specifically, the base value computation circuit 121 determines whether a steering-forth operation or a steering-back operation is performed on the basis of the sign and fluctuations of the drive torque Tc, and computes the base value Thyb* on the basis of the map illustrated in FIG. 10A during a steering-forth operation. The map according to the present embodiment is set such that the absolute value of the base value Thyb* becomes larger, and the absolute value of the rate of variation in the base value Thyb* with respect to the drive torque Tc becomes smaller, as the absolute value of the drive torque Tc becomes larger. The map is also set such that the absolute value of the base value Thyb* is equal to or less than a maximum value Tmax set in advance in the case where the drive torque Tc is equal to or higher than a predetermined drive torque. In the case where a steering-forth operation toward the right is performed, the base value computation circuit 121 uses the base value Thyb* indicated in the first quadrant using the drive torque Tc at the position of start of the steering-forth operation as the origin of the map. In the case where a steering-forth operation toward the left is performed, meanwhile, the base value computation circuit 121 uses the base value Thyb* indicated in the third quadrant using the drive torque Tc at the position of start of the steering-forth operation as the origin of the map.

Figure 10B:
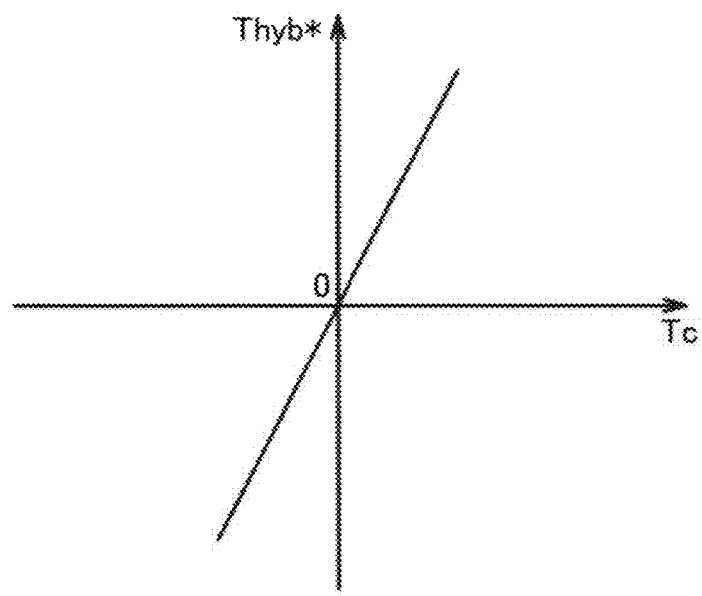
FIG. 10B is a graph illustrating the relationship between the drive torque and the base value during a steering-back operation.

During a steering-back operation, on the other hand, the base value computation circuit 121 computes the base value Thyb* on the basis of the map illustrated in FIG. 10B. The map according to the present embodiment is set such that the base value Thyb* becomes larger in proportion to the drive torque Tc and is set only within a predetermined torque range. In the case where a steering-back operation toward the right is performed, the base value computation circuit 121 uses the base value Thyb* indicated in the first quadrant using the drive torque Tc at the position of start of the steering-back operation as the origin of the map. After a steering-forth operation is performed for an angle corresponding to half the predetermined torque range (range in which the base value Thyb* is set in FIG. 10A), further, the base value computation circuit 121 uses the base value Thyb* indicated in the first quadrant using the drive torque Tc al that position as the origin of the map illustrated in FIG. 10A. In the case where a steering-back operation toward the left is performed, meanwhile, the base value computation circuit 121 uses the base value Thyb* indicated in the third quadrant using the drive torque Tc at the position of start of the steering-back operation as the origin of the map. After a steering-forth operation is performed for an angle corresponding to half the predetermined torque range, further, the base value computation circuit 121 uses the base value Thyb* indicated in the third quadrant using the drive torque Tc at that position as the origin of the map illustrated in FIG. 10A.

Figure 11:
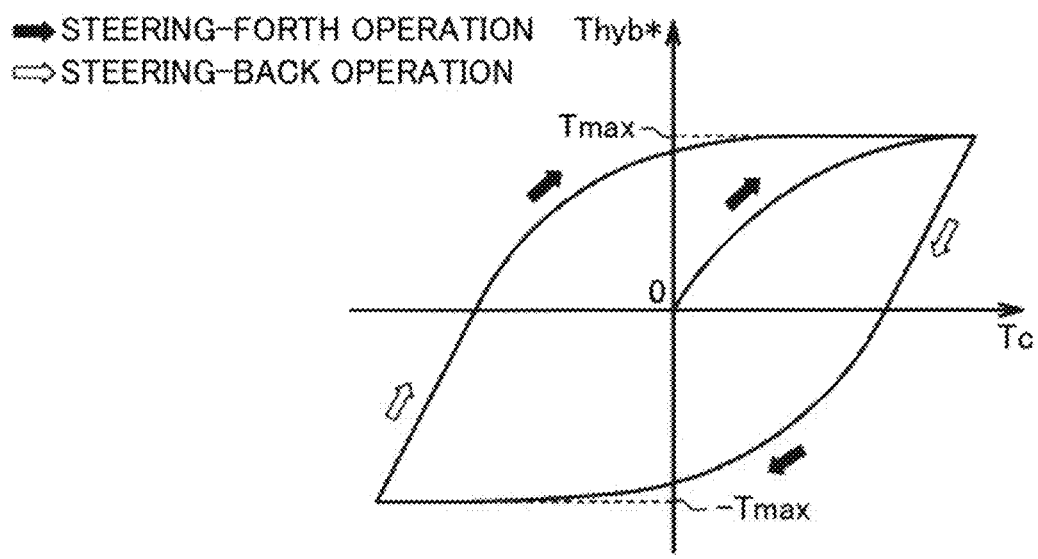
FIG. 11 is a graph illustrating the relationship between the drive torque and the base value for a case where a sinusoidal steering operation is performed.

Consequently, as illustrated in FIG. 11, when a sinusoidal steering operation in which the steering wheel 11 is repeatedly steered back and forth periodically at a constant frequency, for example, is performed, the base value computation circuit 121 computes the base value Thyb* which has hysteresis characteristics with respect to variations in the drive torque Tc. The thus computed base value Thyb* is output to a multiplier 122.

As illustrated in FIG. 9, the hysteresis component computation circuit 115 also includes a base value gain computation circuit 125 that computes a base value gain Khyb for adjusting the base value Thyb* in accordance with the vehicle speed V. The base value gain computation circuit 123 receives the vehicle speed V as an input. The base value gain computation circuit 123 includes a map that defines the relationship between the vehicle speed V and the base value gain Khyb, and computes the base value gain Khyb which matches the vehicle speed V by referencing the map. The map is set such that the base value gain Khyb is a negative value in a region in which the vehicle speed V is low, the base value gain Khyb becomes higher on the basis of an increase in the vehicle speed V, and the base value gain Khyb becomes generally constant after reaching a positive value. The thus computed base value gain Khyb is output to the multiplier 122. In the hysteresis component computation circuit 115, the multiplier 122 computes a fundamental hysteresis component Thyb*' by multiplying the base value Thyb* by the base value gain Khyb, and outputs the computed value to a multiplier 124.

The hysteresis component computation circuit 115 also includes a hysteresis adjustment gain computation circuit 125 that computes a hysteresis adjustment gain Khya for adjusting the hysteresis component Thy*. The hysteresis adjustment gain computation circuit 125 receives, as inputs, the grip state amount Gr and the vehicle speed V. The hysteresis adjustment gain computation circuit 125 includes a map that defines the relationship between the grip state amount Gr and the vehicle speed V and the hysteresis adjustment gain Khya, and computes the hysteresis adjustment gain Khya which matches the grip state amount Gr and the vehicle speed V by referencing the map. While the map in the present embodiment is set so as to be similar to the map of the fundamental adjustment gain computation circuit 112, the map may be set so as to have a different shape.

The thus computed hysteresis adjustment gain Kyha is output to the multiplier 124. The hysteresis component computation circuit 115 outputs the hysteresis component Thy*, which is obtained by the multiplier 124 multiplying the fundamental hysteresis component Thyb*' by the hysteresis adjustment gain Khya, to the adder 114 (see FIG. 8). As illustrated in FIG. 8, the torque command value computation circuit 72 computes the torque command value Th* by adding the hysteresis component Thy* to the command fundamental value Thb*', and the input torque fundamental component Tb* is computed by the input torque fundamental component computation circuit 62 as described above.

Figure 12:
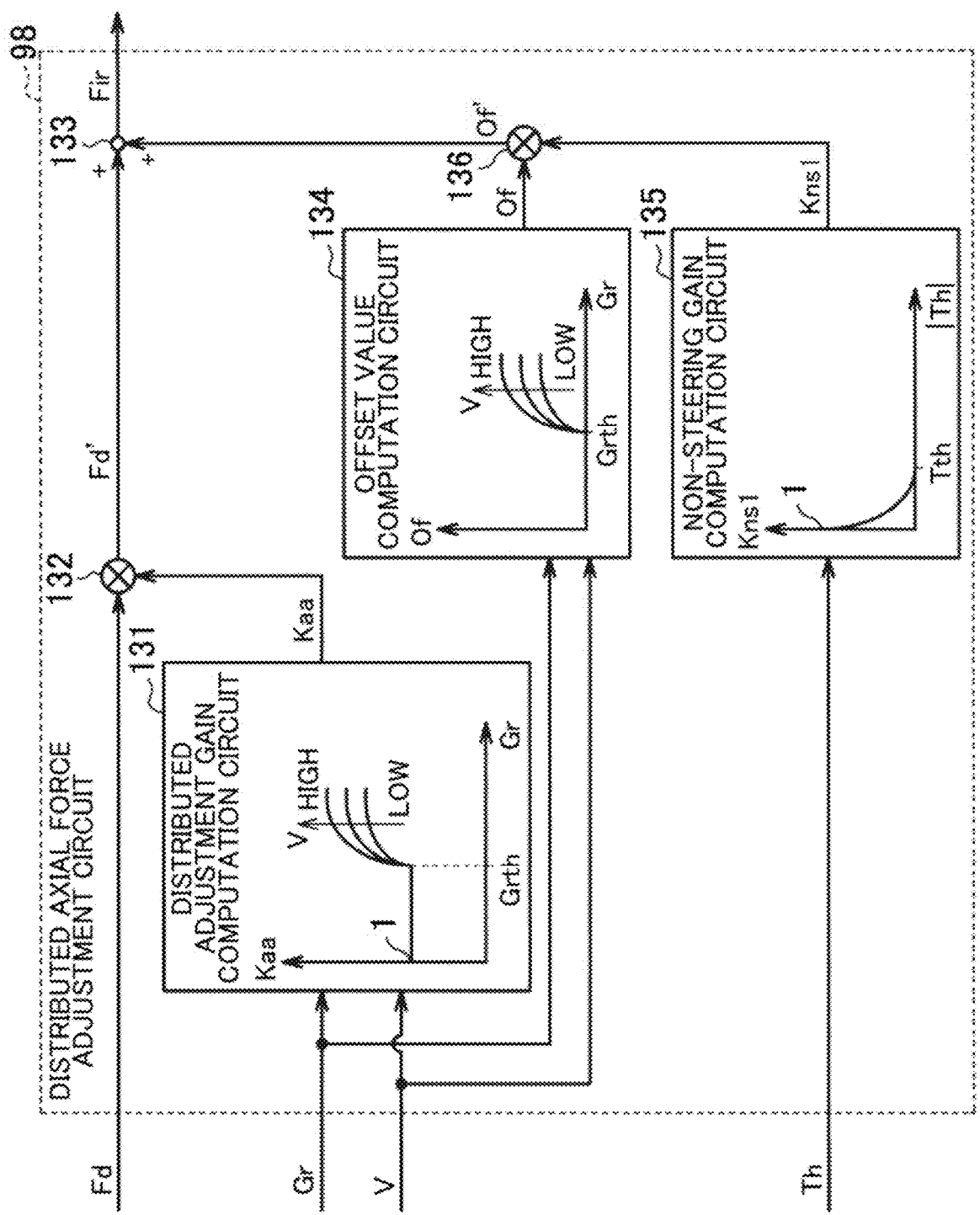
FIG. 12 is a block diagram of a distributed axial force adjustment circuit according to the first embodiment.

Next, the configuration of the distributed axial force adjustment circuit 98 will be described in detail. As illustrated in FIG. 12, the distributed axial force adjustment circuit 98 includes a distributed adjustment gain computation circuit 131. The distributed adjustment gain computation circuit 131 receives, as inputs, the grip state amount Gr and the vehicle speed V. The distributed adjustment gain computation circuit 131 includes a map that defines the relationship between the grip state amount Gr and the vehicle speed V and a distributed adjustment gain Kaa, and computes the distributed adjustment gain Kaa which matches the grip state amount Gr and the vehicle speed V by referencing the map. While the map in the present embodiment is set so as to be similar to the map of the fundamental adjustment gain computation circuit 112, the map may be set so as to have a different shape. The thus computed distributed adjustment gain Kaa is output to a multiplier 132 together with the distributed axial force Fd.

The distributed axial force adjustment circuit 98 outputs a value obtained by the multiplier 132 multiplying the distributed axial force Fd by the distributed adjustment gain Kaa to an adder 133 as a gradient adjustment distributed axial force Fd'. The distributed axial force adjustment circuit 98 also includes an offset value computation circuit 134 and a non-steering gain computation circuit 135.

The offset value computation circuit 134 receives, as inputs, the grip state amount Gr and the vehicle speed V. The offset value computation circuit 134 includes a map that defines the relationship between the grip state amount Gr and the vehicle speed V and the offset value Of, aid computes the offset value Of which matches the grip state amount Gr and the vehicle speed V by referencing the map. The map is set such that the offset value Of is zero in a region in which the grip state amount Gr is equal to or less than a grip threshold Grth and the offset value Of becomes larger on the basis of an increase in the grip state amount Gr when the grip state amount Gr is larger than the grip threshold Grth. The map is also set such that the offset value Of becomes larger on the basis of an increase in the vehicle speed V in a region in which the grip state amount Gr is larger than the grip threshold Grth. The shape of the map is changeable as appropriate. For example, the map may be set such that the offset value Of becomes smaller (becomes a negative value) on the basis of an increase in the grip state amount Gr, or the offset value Of becomes smaller on the basis of an increase in the vehicle speed V, in a region in which the grip state amount Gr is larger than the grip threshold Grth. The thus computed offset value Of is output to a multiplier 136.

The non-steering gain computation circuit 135 receives the steering torque Th as an input. The non-steering gain computation circuit 135 includes a map that defines the relationship between the steering torque Th and a non-steering gain Kns1, and computes the non-steering gain Kns1 which matches the steering torque Th by referencing the map. The map is set such that the non-steering gain Kns1 is "1" in the case where the absolute value of the steering torque Th is zero, the non-steering gain Kns1 is decreased on the basis of an increase in the absolute value of the steering torque Th, and the non-steering gain Kns1 is zero when the absolute value of the steering torque Th is larger than a non-steering threshold Tth. The non-steering threshold Tth is a value at which the driver is recognized as performing a steering operation, and is set in advance to a value that is close to zero. The thus computed non-steering gain Kns1 is output to the multiplier 136.

The distributed axial force adjustment circuit 98 outputs an offset value Of, which is obtained by the multiplier 136 multiplying the offset value Of by the non-steering gain Kns1, to the adder 133. In the distributed axial force adjustment circuit 98, the adder 133 computes the reaction force component Fir as a value obtained by adding the offset value Of to the gradient adjustment distributed axial force Fd'. As described above, the non-steering gain Kns1 is zero in the case where the driver is performing a steering operation. Thus, the offset value Of is added to adjust the distributed axial force Fd only when a steering operation is not performed.

Figure 13:
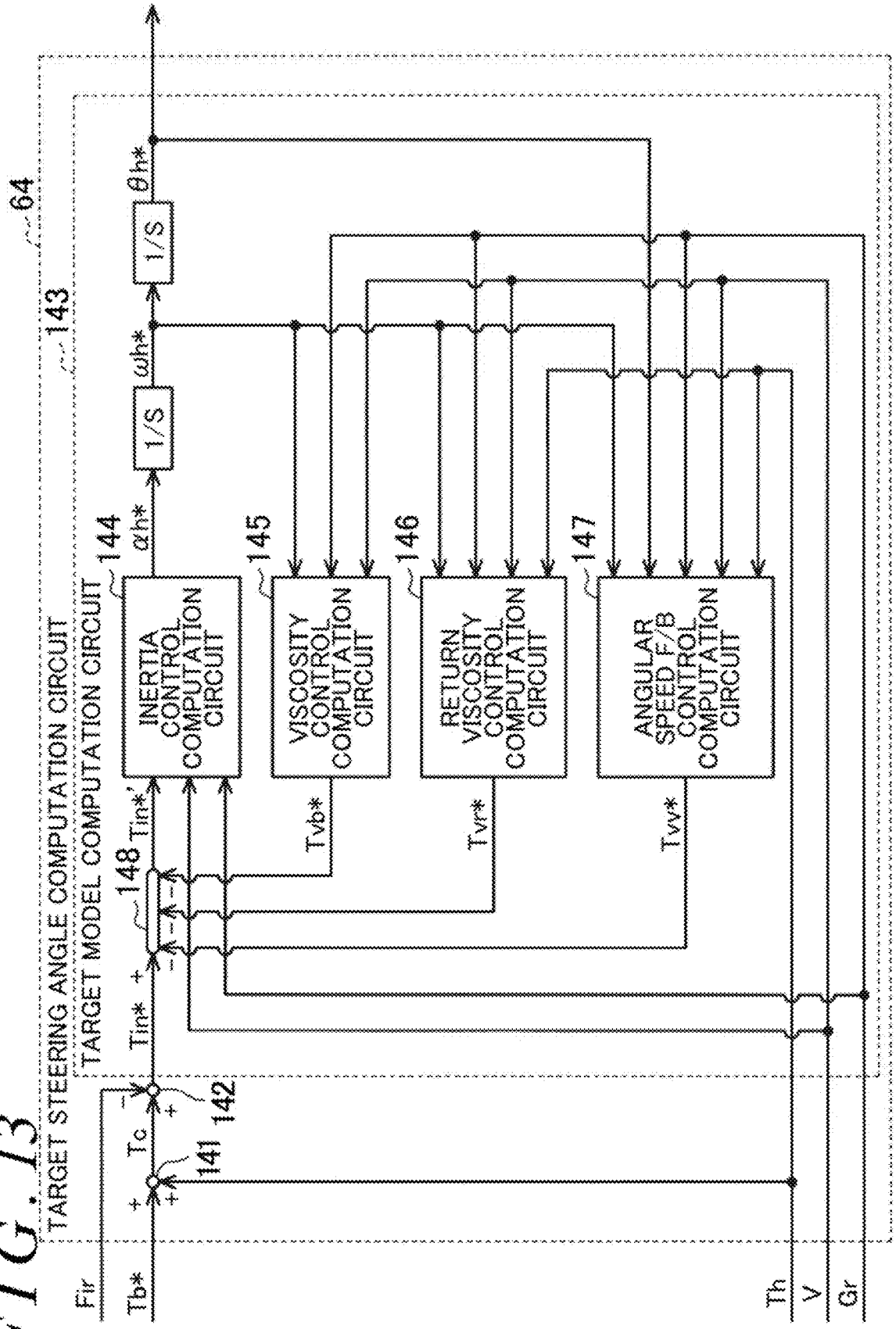
FIG. 13 is a block diagram of a target steering angle computation circuit according to the first embodiment.

Next, the configuration of the target steering angle computation circuit 64 will be described. As illustrated in FIG. 13, the target steering angle computation circuit 64 includes an adder 141 that receives, as an input, the steering torque Th together with the input torque fundamental component Tb*, and the adder 141 adds such components to compute the drive torque Tc. The target steering angle computation circuit 64 also includes a subtractor 142 that receives, as an input, the reaction force component Fir together with the drive torque Tc, and the subtractor 142 computes the input torque Tin* by subtracting the reaction force component Fir from the drive torque Tc. The thus computed input torque Tin* is input to a target model computation circuit 143.

The target model computation circuit 143 includes an inertia control computation circuit 144 corresponding to the inertia term of the above model formula, and a viscosity control computation circuit 145 corresponding to the viscous term thereof. The target model computation circuit 143 also includes a return viscosity control computation circuit 146 that corresponds to the viscous term of the model formula and that acts in the case where the vehicle is in a non-steering state. The target model computation circuit 143 also includes an angular speed feedback control computation circuit (hereinafter referred to as an "angular speed F/B control computation circuit") 147 that causes a target steering speed $\omega h^*$, which is a target value for the angular speed of the rotary shaft in the model formula, to follow a target compensation angular speed $\omega r^*$.

The inertia control computation circuit 144 receives, as an input, input torque Tin*' obtained by a subtractor 148 subtracting, from the input torque Tin*, target viscosity torque Tvb* which is output from the viscosity control computation circuit 145, target return viscosity torque Tvr* which is output from the return viscosity control computation circuit 146, and target compensation angular speed torque Tvv* which is output from the angular speed F/B control computation circuit 147. The inertia control computation circuit 144 also receives, as inputs, the vehicle speed V and the grip state amount Gr in addition to the input torque Tin*'. The inertia control computation circuit 144 computes a target steering acceleration $\alpha h^*$ (target angular acceleration of the rotary shaft) on the basis of such input state amounts. The target model computation circuit 143 computes the target steering speed $\omega h^*$ (target angular speed of the rotary shaft) by integrating the target steering acceleration $\alpha h^*$, and computes the target steering angle $\theta h^*$ for the steering wheel 11 by integrating the target steering speed $\omega h^*$. The thus computed target steering speed $\omega h^*$ is output to the viscosity control computation circuit 145, the return viscosity control computation circuit 146, and the angular speed F/B control computation circuit 147, and the target steering angle $\theta h^*$ is output to the angular speed F/B control computation circuit 147, the subtractor 69, and the reaction force component computation circuit 63 (see FIG. 2). The signs of the target steering acceleration $\alpha h^*$, the target viscosity torque Tvb*, the target return viscosity torque Tvr*, and the target compensation angular speed torque Tvv* are set in the same manner as the signs of the steering torque Th and the rotational angles $\theta s$ and $\theta t$. In the case where the target steering acceleration $\alpha h^*$ is a positive value, the target viscosity torque Tvb* and the target return viscosity torque Tvr* are each computed so as to be a positive value, and the target compensation angular speed torque Tvv* is computed so as to be a negative value.

The viscosity control computation circuit 145 receives, as inputs, the vehicle speed V and the grip state amount Gr in addition to the target steering speed $\omega h^*$. The viscosity control computation circuit 145 computes the target viscosity torque Tvb*, which is to be subtracted from the input torque Tin*, on the basis of such state amounts. The return viscosity control computation circuit 146 receives, as inputs, the steering torque Th, the vehicle speed V, and the grip state amount Gr in addition to the target steering speed $\omega h^*$. The return viscosity control computation circuit 146 computes the target return viscosity torque Tvr*, which is to be subtracted from the input torque Tin*, on the basis of such state amounts. The angular speed F/B control computation circuit 147 receives, as inputs, the steering torque Th, the vehicle speed V, and the grip state amount Gr in addition to the target steering speed $\omega h^*$ and the target steering angle $\theta h^*$. The angular speed F/B control computation circuit 147 computes the target compensation angular speed torque Tvv*, which is to be subtracted from the input torque Tin*, on the basis of such state amounts.

Figure 14:
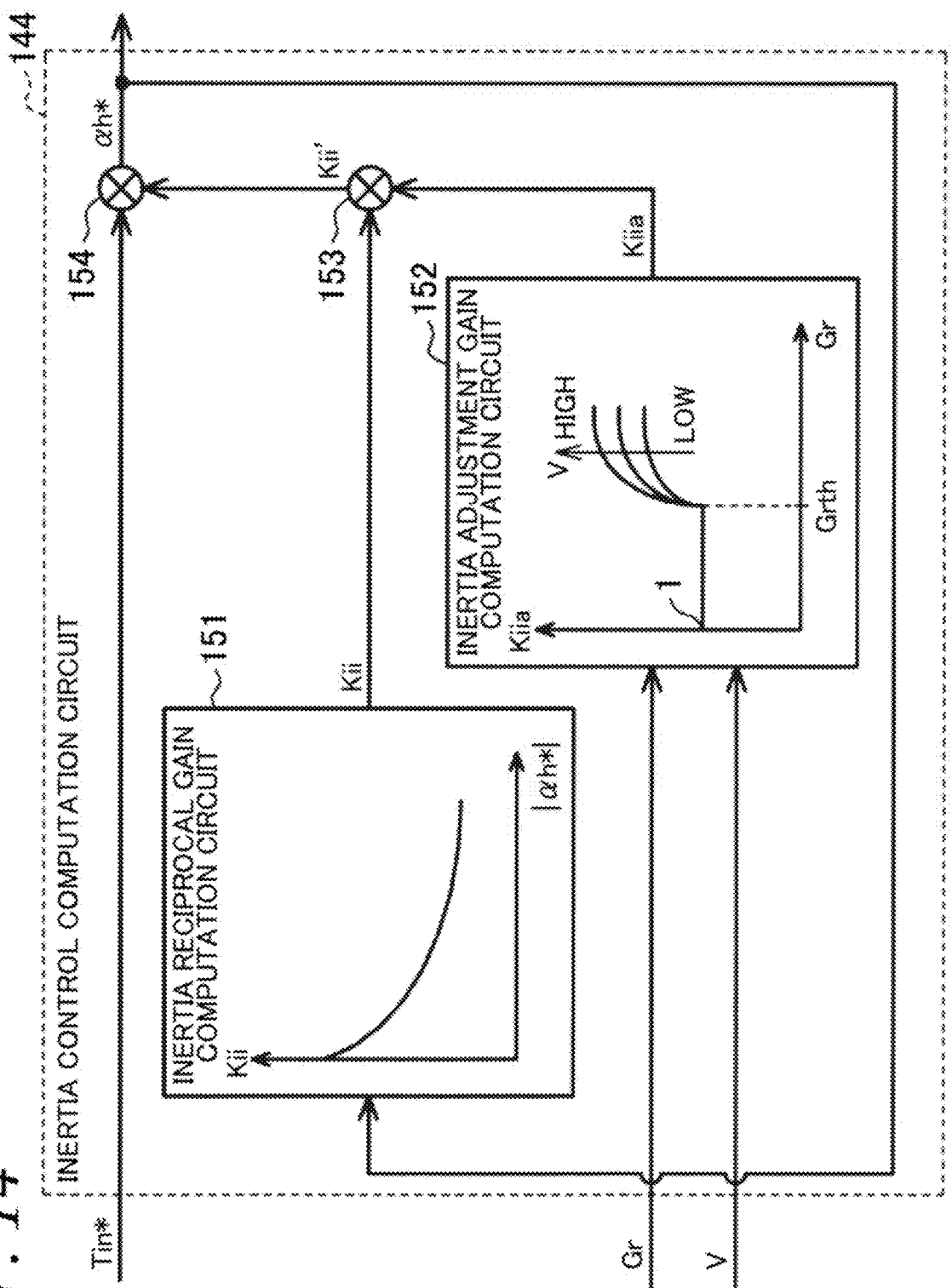
FIG. 14 is a block diagram of an inertia control computation circuit according to the first embodiment.

Next, the configuration of the inertia control computation circuit 144 will be described. As illustrated in FIG. 14, the inertia control computation circuit 144 includes an inertia reciprocal gain computation circuit 151 that computes an inertia reciprocal gain Kii on the basis of the target steering acceleration $\alpha h^*$, and an inertia adjustment gain computation circuit 152 that computes an inertia adjustment gain Kiia for adjusting the inertia reciprocal gain Kii.

The inertia reciprocal gain computation circuit 151 receives the target steering acceleration αh* as an input. The inertia reciprocal gain computation circuit 151 includes a map that defines the relationship between the target steering acceleration αh* and the inertia reciprocal gain Kii, and computes the inertia reciprocal gain Kii which matches the target steering acceleration αh* by referencing the map. The map is set such that the inertia reciprocal gain Kii is decreased non-linearly on the basis of an increase in the target steering acceleration αh*. The thus computed inertia reciprocal gain Kii is output to a multiplier 153.

The inertia adjustment gain computation circuit 152 receives, as inputs, the grip state amount Gr and the vehicle speed V. The inertia adjustment gain computation circuit 152 includes a map that defines the relationship between the grip state amount Gr and the vehicle speed V and the inertia adjustment gain Kiia, and computes the inertia adjustment gain Kiia which matches the grip state amount Gr and the vehicle speed V by referencing the map. While the map in the present embodiment is set so as to be similar to the map of the fundamental adjustment gain computation circuit 112, the map may be set so as to have a different shape. The thus computed inertia adjustment gain Kiia is output to the multiplier 153.

In the inertia control computation circuit 144, the multiplier 153 computes an inertia reciprocal gain Kii' as a value obtained by multiplying the inertia reciprocal gain Kii by the inertia adjustment gain Kiia, and outputs the computed value to a multiplier 154. In the inertia control computation circuit 144, the multiplier 154 computes the target steering acceleration αh* by multiplying the input torque Tin* by the inertia reciprocal gain Kii'.

Figure 15:
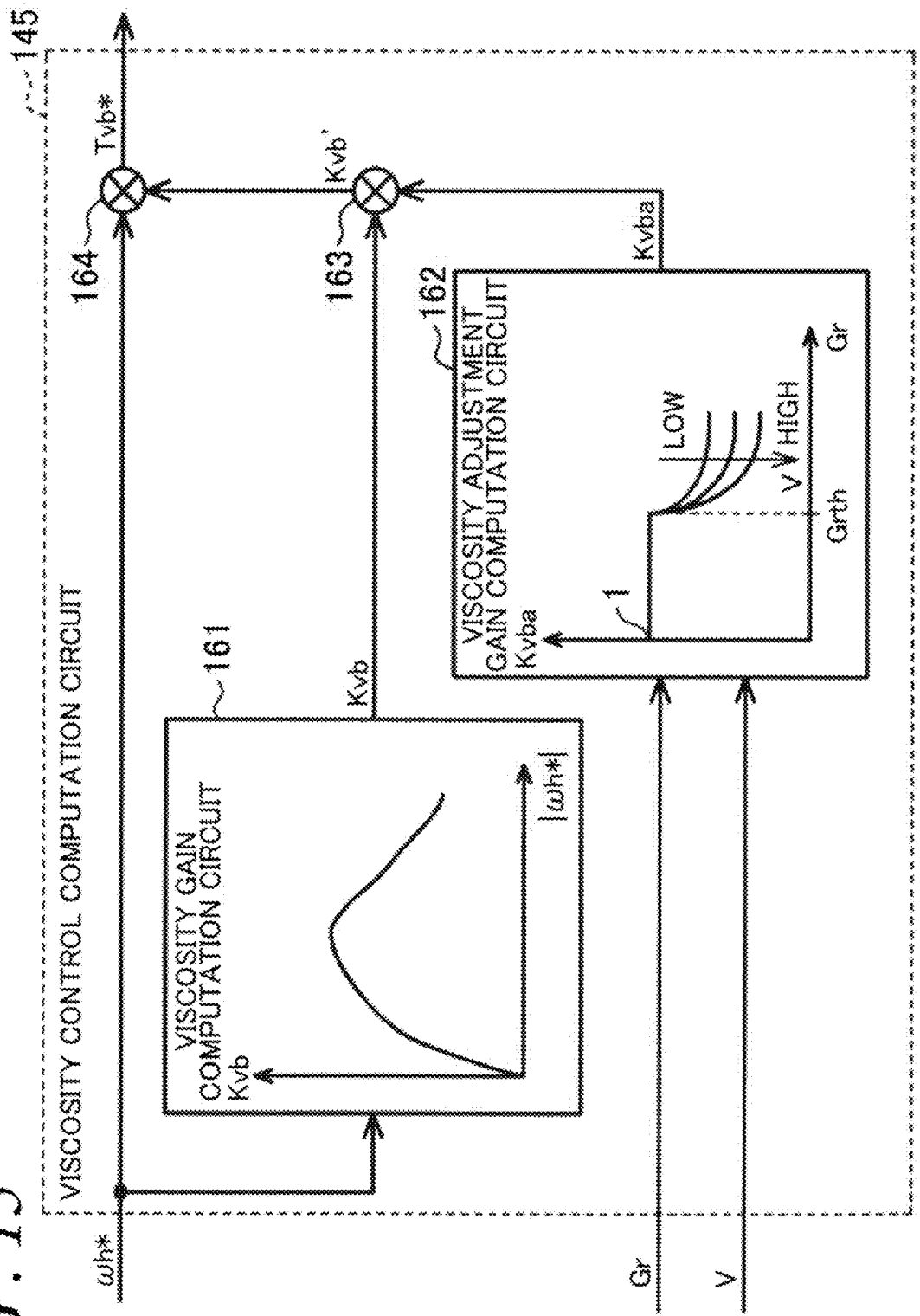
FIG. 15 is a block diagram of a viscosity control computation circuit according to the first embodiment.

Next, the configuration of the viscosity control computation circuit 145 will be described. As illustrated in FIG. 15, the viscosity control computation circuit 145 includes a viscosity gain computation circuit 161 that computes a viscosity gain Kvb on the basis of the target steering speed ωh*, and a viscosity adjustment gain computation circuit 162 that computes a viscosity adjustment gain Kvba for adjusting the viscosity gain Kvb.

The viscosity gain computation circuit 161 receives the target steering speed ωh* as an input. The viscosity gain computation circuit 161 includes a map that defines the relationship between the target steering speed ωh* and the viscosity gain Kvb, and computes the viscosity gain Kvb which matches the target steering speed ωh* by referencing the map. The map is set such that the viscosity gain Kvb is increased non-linearly on the basis of an increase in the target steering speed ωh* and thereafter decreased. The thus computed viscosity gain Kvb is output to a multiplier 163.

The viscosity adjustment gain computation circuit 162 receives, as inputs, the grip state amount Gr and the vehicle speed V. The viscosity adjustment gain computation circuit 162 includes a map that defines the relationship between the grip state amount Gr and the vehicle speed V and the viscosity adjustment gain Kvba, and computes the viscosity adjustment gain Kvba which matches the grip state amount Gr and the vehicle speed V by referencing the map. The map is set such that the viscosity adjustment gain Kvba is "1" in a region in which the grip state amount Gr is equal to or less than a grip threshold Grth and the viscosity adjustment gain Kvba becomes lower on the basis of an increase in the grip state amount Gr when the grip state amount Gr is larger than the grip threshold Grth. The map is also set such that the viscosity adjustment gain Kvba becomes lower on the basis of an increase in the vehicle speed V in a region in which the grip state amount Gr is larger than the grip threshold Grth. The shape of the map is changeable as appropriate. The map may be set such that the viscosity adjustment gain Kvba becomes higher on the basis of an increase in the grip state amount Gr, or the viscosity adjustment gain Kvba becomes higher on the basis of an increase in the vehicle speed V, in a region in which the grip state amount Gr is larger than the grip threshold Grth. The thus computed viscosity adjustment gain Kvba is output to the multiplier 163.

In the viscosity control computation circuit 145, the multiplier 163 computes a viscosity gain Kvb' as a value obtained by multiplying the viscosity gain Kvb by the viscosity adjustment gain Kvba, and outputs the computed value to a multiplier 164. In the viscosity control computation circuit 145, the multiplier 164 computes the target viscosity torque Tvb* by multiplying the target steering speed ωh* by the viscosity gain Kvb'.

Figure 16:
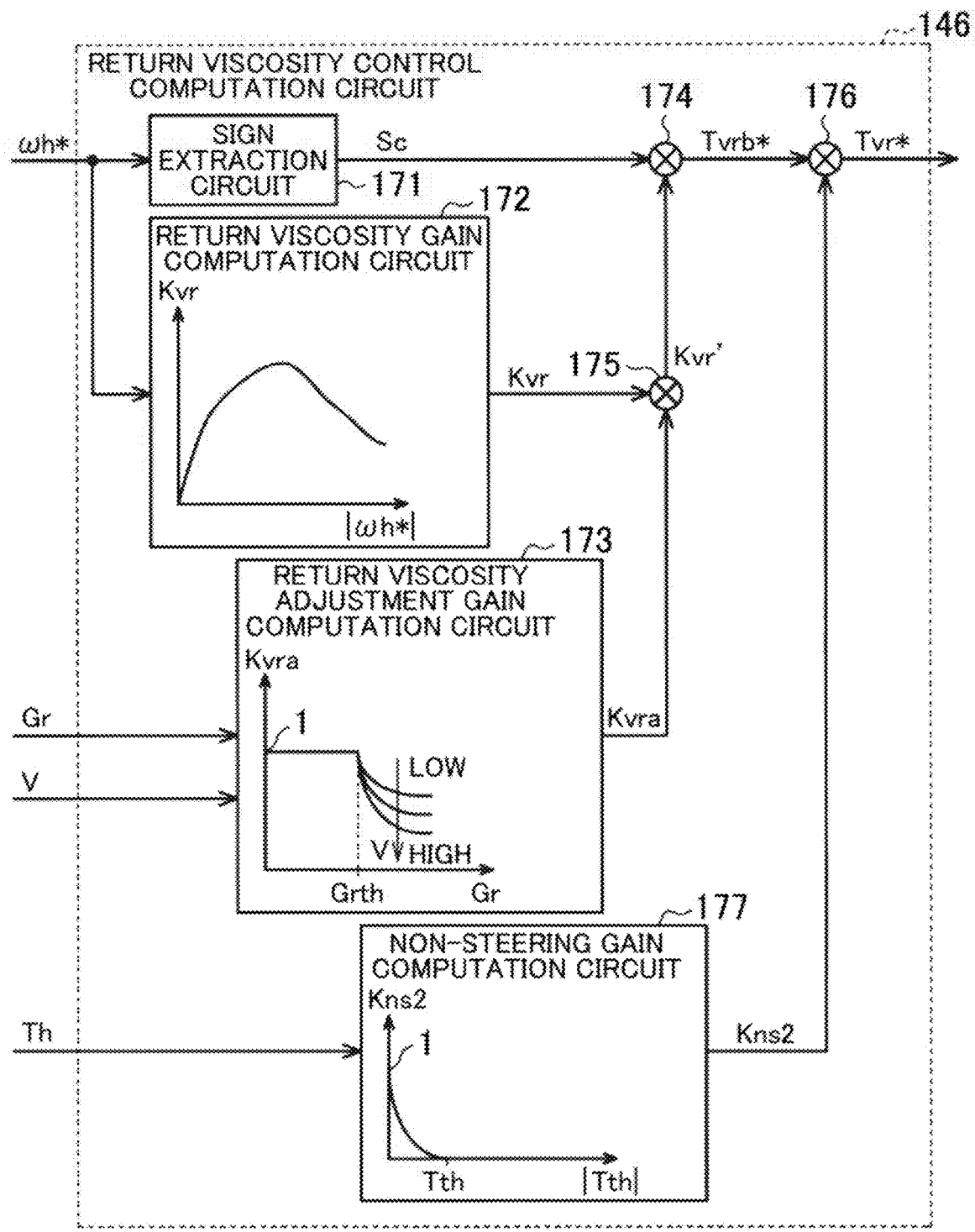
FIG. 16 is a block diagram of a return viscosity control computation circuit according to the first embodiment.

Next, the configuration of the return viscosity control computation circuit 146 will be described. As illustrated in FIG. 16, the return viscosity control computation circuit 146 includes a sign extraction circuit 171 that extracts the sign of the target steering speed ωh* on the basis of the target steering speed ωh*, a return viscosity gain computation circuit 172 that computes a return viscosity gain Kvr, and a return viscosity adjustment gain computation circuit 173 that computes a return viscosity adjustment gain Kvra for adjusting the return viscosity gain Kvr.

The sign extraction circuit 171 receives the target steering speed ωh* as an input. The sign extraction circuit 171 outputs a sign signal Sc that indicates "1" to a multiplier 174 in the case where the target steering speed ωh* is a positive value, and outputs a sign signal Sc that indicates "−1" to the multiplier 174 in the case where the target steering speed ωh* is a negative value.

The return viscosity gain computation circuit 172 receives the target steering speed ωh* as an input. The return viscosity gain computation circuit 172 includes a map that defines the relationship between the target steering speed ωh* and the return viscosity gain Kvr, and computes the return viscosity gain Kvr which matches the target steering speed ωh* by referencing the map. The map is set such that the return viscosity gain Kvr is increased non-linearly on the basis of an increase in the target steering speed ωh* and thereafter decreased. The thus computed return viscosity gain Kvr is output to a multiplier 175.

The return viscosity adjustment gain computation circuit 173 receives, as inputs, the grip state amount Gr and the vehicle speed V. The return viscosity adjustment gain computation circuit 173 includes a map that defines the relationship between the grip state amount Gr and lie vehicle speed V and the return viscosity adjustment gain Kvra, and computes the return viscosity adjustment gain Kvra which matches the grip state amount Gr and the vehicle speed V by referencing the map. While the map in the present embodiment is set so as to be similar to the map of the viscosity adjustment gain computation circuit 162, the map may be set so as to have a different shape. The thus computed return viscosity adjustment gain Kvra is output to the multiplier 175.

In the return viscosity control computation circuit 146, the multiplier 175 computes a return viscosity gain Kvr' as a value obtained by multiplying the return viscosity gain Kvr by the return viscosity adjustment gain Kvra, and outputs the computed value to the multiplier 174. In the viscosity control computation circuit 145, the multiplier 174 computes fundamental return viscosity torque Tvrb* as a value obtained by multiplying the sign signal Sc by the return viscosity gain Kvr', and outputs the computed value to a multiplier 176.

The return viscosity control computation circuit 146 also includes a non-steering gain computation circuit 177. The non-steering gain computation circuit 177 receives the steering torque Th as an input. The non-steering gain computation circuit 177 includes a map that defines the relationship between the steering torque Th and a non-steering gain Kns2, and computes the non-steering gain Kns2 which matches the steering torque Th by referencing the map. While the map in the present embodiment is set so as to be similar to the map of the non-steering gain computation circuit 135, the map may be set so as to have a different shape. The thus computed non-steering gain Kns2 is output to the multiplier 176. In the return viscosity control computation circuit 146, the multiplier 176 computes the target return viscosity torque Tvr* as a value obtained by multiplying the fundamental return viscosity torque Tvrb* by the non-steering gain Kns2, and outputs the computed value. As described above, the non-steering gain Kns2 is zero in the case where the driver is performing a steering operation. Thus, the target return viscosity torque Tvr* is output in a non-steering state.

Figure 17:
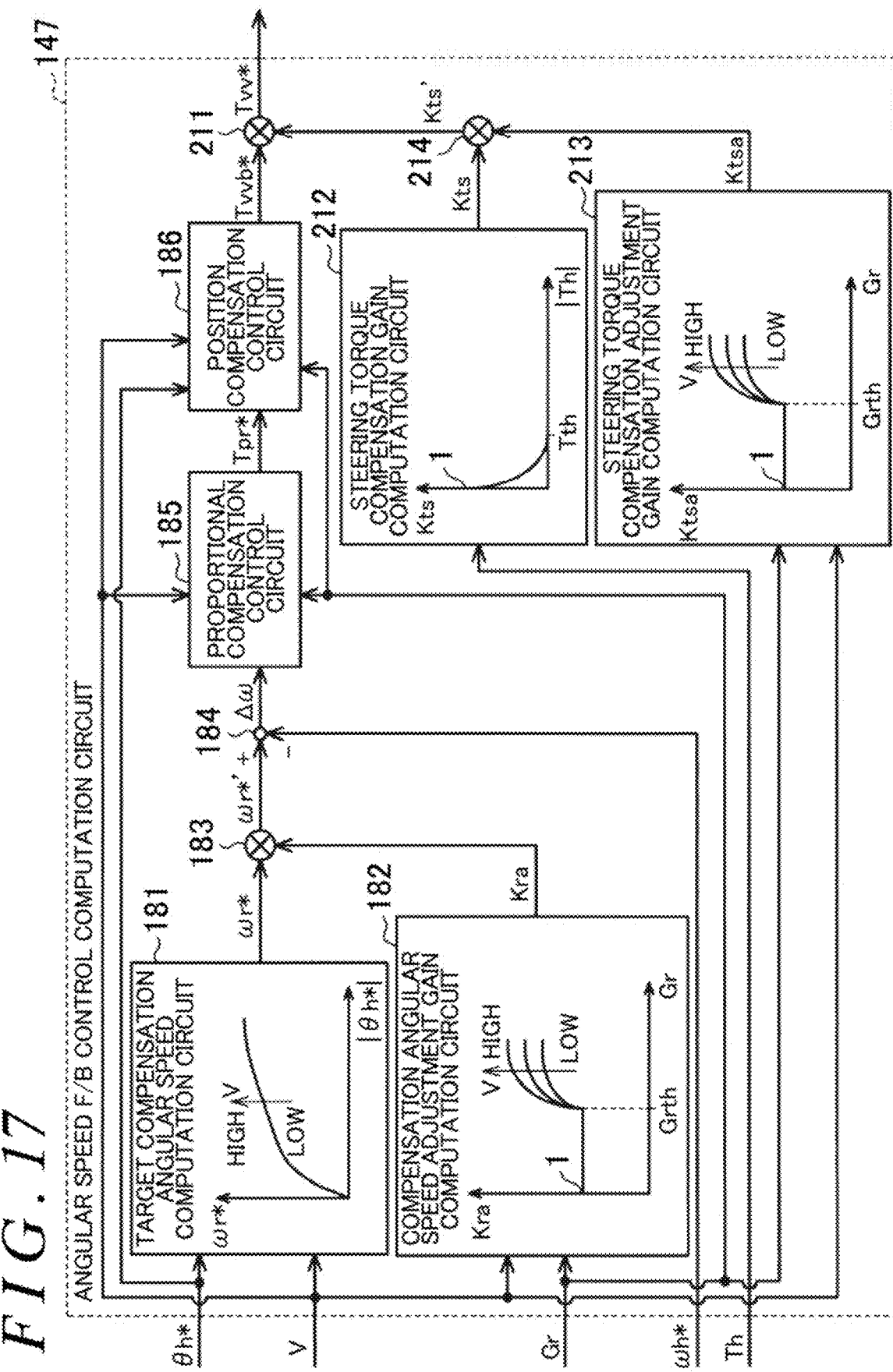
FIG. 17 is a block diagram of an angular speed F/B control computation circuit according to the first embodiment.

Next, the configuration of the angular speed F/B control computation circuit 147 will be described. As illustrated in FIG. 17, the angular speed F/B control computation circuit 147 includes a target compensation angular speed computation circuit 181 that computes the target compensation angular speed ωr* on the basis of the target steering angle θh*, and a compensation angular speed adjustment gain computation circuit 182 that computes a compensation angular speed adjustment gain Kra for adjusting the target compensation angular speed ωr*.

The target compensation angular speed computation circuit 181 receives, as inputs, the target steering angle θh* and the vehicle speed V. The target compensation angular speed computation circuit 181 includes a map that defines the relationship between the target steering angle θh* and the vehicle speed V and the target compensation angular speed ωr*, and computes the target compensation angular speed ωr* which matches the target steering angle θh* and the vehicle speed V by referencing the map. The map is set such that the target compensation angular speed ωr* is increased non-linearly on the basis of an increase in the target steering angle θh*. While the map in the present embodiment is set such that the target compensation angular speed ωr* becomes higher on the basis of an increase in the vehicle speed V, the map may be set such that the target compensation angular speed ωr* becomes lower on the basis of an increase in the vehicle speed V.

The compensation angular speed adjustment gain computation circuit 182 receives, as inputs, the grip state amount Gr and the vehicle speed V. The compensation angular speed adjustment gain computation circuit 182 includes a map that defines the relationship between the grip state amount Gr and the vehicle speed V and the compensation angular speed adjustment gain Kra, and computes the compensation angular speed adjustment gain Kra which matches the grip state amount Gr and the vehicle speed V by referencing the map. While the map in the present embodiment is set so as to be similar to the map of the fundamental adjustment gain computation circuit 112, the map may be set so as to have a different shape. The thus computed compensation angular speed adjustment gain Kra is output to a multiplier 183.

In the angular speed F/B control computation circuit 147, the multiplier 183 computes a target compensation angular speed ωr*' as a value obtained by multiplying the target compensation angular speed ωr* by the compensation angular speed adjustment gain Kra, and outputs the computed value to a subtractor 184. The subtractor 184 receives, as an input, the target steering speed ωh* in addition to the target compensation angular speed ωr*'. In the angular speed F/B control computation circuit 147, the subtractor 184 computes an angular speed deviation Δω by subtracting the target steering speed ωh* from the target compensation angular speed ωr*'.

The angular speed F/B control computation circuit 147 includes a proportional compensation control circuit 185 and a position compensation control circuit 186 that perform compensation control on the angular speed deviation Δω in order to cause the target steering speed ωh* to follow the target compensation angular speed ωr*. The proportional compensation control circuit 185 receives, as inputs, the vehicle speed V and the grip state amount Gr in addition to the angular speed deviation Δω. The proportional compensation control circuit 185 computes a proportional component Tpr* on the basis of such state amounts.

Figure 18:
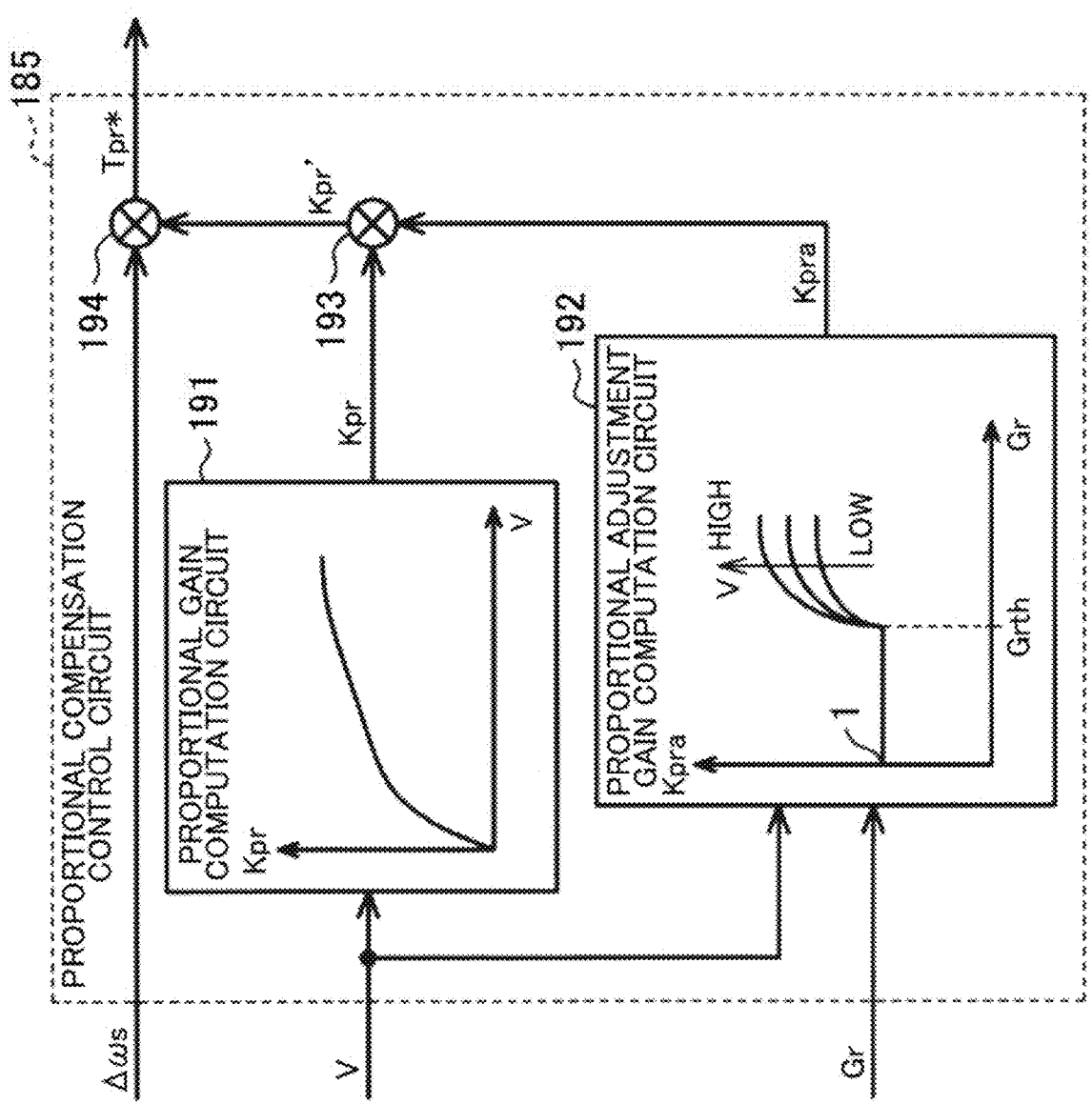
FIG. 18 is a block diagram of a proportional compensation control circuit according to the first embodiment.

Particularly, as illustrated in FIG. 18, the proportional compensation control circuit 185 includes a proportional gain computation circuit 191 that computes a proportional gain Kpr on the basis of the vehicle speed V, and a proportional adjustment gain computation circuit 192 that computes a proportional adjustment gain Kpra for adjusting the proportional gain Kpr.

The proportional gain computation circuit 191 receives the vehicle speed V as an input. The proportional gain computation circuit 191 includes a map that defines the relationship between the vehicle speed V and the proportional gain Kpr, and computes the proportional gain Kpr which matches the vehicle speed V by referencing the map. The map is set such that the proportional gain Kpr is increased non-linearly on the basis of an increase in the vehicle speed V. The thus computed proportional gain Kpr is output to a multiplier 193.

The proportional adjustment gain computation circuit 192 receives, as inputs, the grip state amount Gr and the vehicle speed V. The proportional adjustment gain computation circuit 192 includes a map that defines the relationship between the grip state amount Gr and the vehicle speed V and the proportional adjustment gain Kpra, and computes the proportional adjustment gain Kpra which matches the grip state amount Gr and the vehicle speed V by referencing the map. While the map in the present embodiment is set so as to be similar to the map of the fundamental adjustment gain computation circuit 112, the map may be set so as to have a different shape. The thus computed proportional adjustment gain Kpra is output to the multiplier 193.

In the proportional compensation control circuit 185, the multiplier 193 computes a proportional gain Kpr' as a value obtained by multiplying the proportional gain Kpr by the proportional adjustment gain Kpra, and outputs the computed value to a multiplier 194. In the proportional compensation control circuit 185, the multiplier 194 computes the proportional component Tpr* by multiplying the angular speed deviation Δω by the proportional gain Kpr'.

As illustrated in FIG. 17, the proportional component Tpr* which is computed by the proportional compensation control circuit 185 is output to the position compensation control circuit 186. The position compensation control circuit 186 receives, as inputs, the target steering angle θh*, the grip state amount Gr, and the vehicle speed V in addition to the proportional component Tpr*. The position compensation control circuit 186 computes fundamental compensation angular speed torque Tvvb* on the basis of such state amounts.

Figure 19:
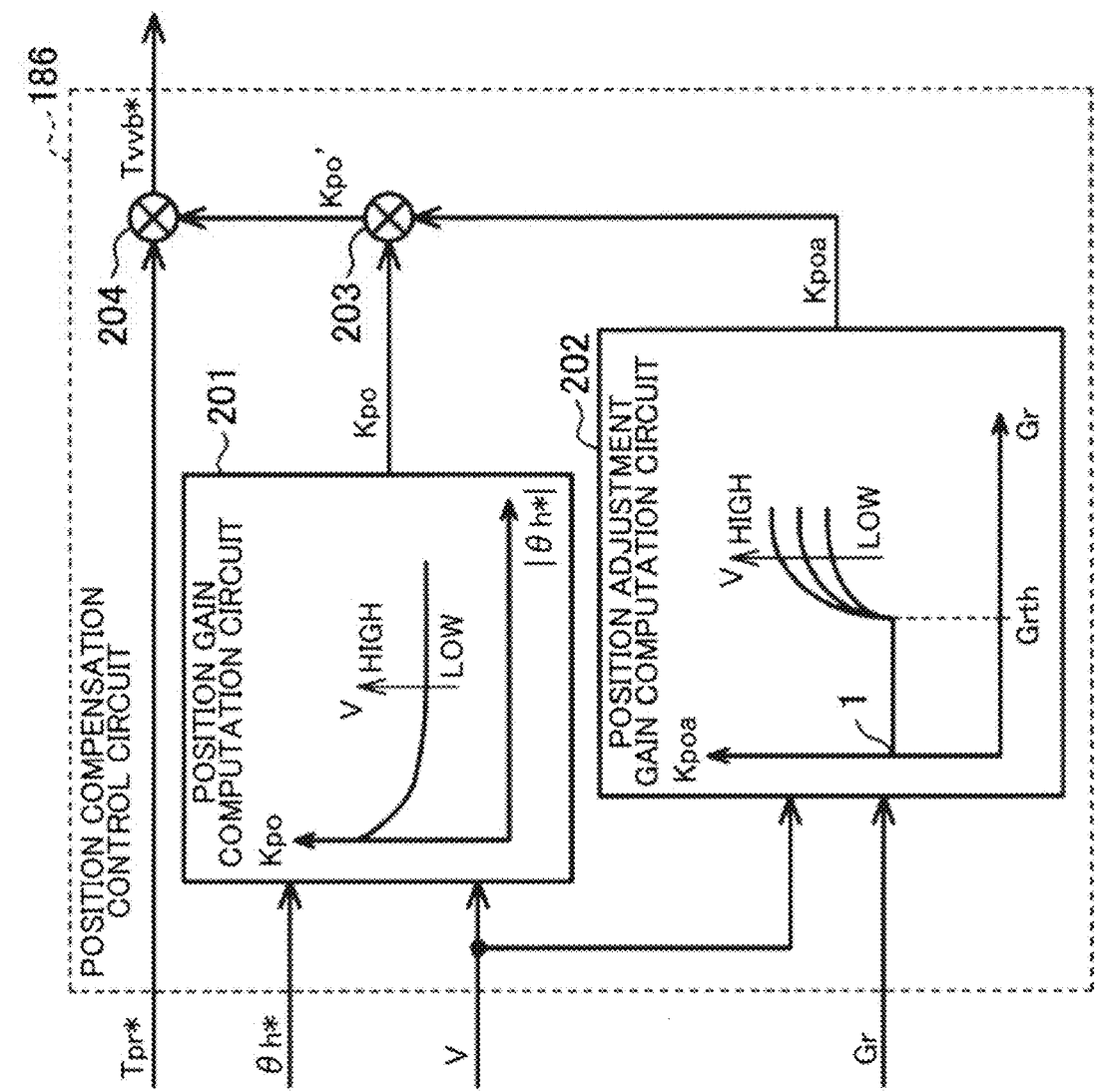
FIG. 19 is a block diagram of a position compensation control circuit according to the first embodiment.

Particularly, as illustrated in FIG. 19, the position compensation control circuit 186 includes a position gain computation circuit 201 that computes a position gain Kpo on the basis of the target steering angle θh* and the vehicle speed V, and a position adjustment gain computation circuit 202 that computes a position adjustment gain Kpoa for adjusting the position gain Kpo.

The position gain computation circuit 201 receives, as inputs, the target, steering angle θh* and the vehicle speed V. The position gain computation circuit 201 includes a map that defines the relationship between the target steering angle θh* and the vehicle speed V and the position gain Kpo, and computes the position gain Kpo which matches the target steering angle θh* by referencing the map. The map is set such that the position gain Kpo is largest in the case where the absolute value of the target steering angle θh* is zero, the position gain Kpo is decreased on the basis of an increase in the absolute value of the target steering angle θh*, and the position gain Kpo is generally constant thereafter. That is, the map is set such that the position gain Kpo is large in the case where the target steering angle θh* corresponds to a position that is close to the steering neutral position. While the map is set such that the position gain Kpo becomes higher on the basis of an increase in the vehicle speed V, the map may be set such that the position gain Kpo becomes lower on the basis of an increase in the vehicle speed V. The thus computed position gain Kpo is output to a multiplier 203.

The position adjustment gain computation circuit 202 receives, as inputs, the grip state amount Gr and the vehicle speed V. The position adjustment gain computation circuit 202 includes a map that defines the relationship between the grip state amount Gr and the vehicle speed V and the position adjustment gain Kpoa, and computes the position adjustment gain Kpoa which matches the grip state amount Gr and the vehicle speed V by referencing the map. While the map in the present embodiment is set so as to be similar to the map of the fundamental adjustment gain computation circuit 112, the map may be set so as to have a different shape. The thus computed position adjustment gain Kpoa is output to the multiplier 203.

In the position compensation control circuit 186, the multiplier 203 computes a position gain Kpo' as a value obtained by multiplying the position gain Kpo by the position adjustment gain Kpoa, and outputs the computed value to a multiplier 204. In the position compensation control circuit 186, the multiplier 204 computes the fundamental compensation angular speed torque Tvvb* by multiplying the proportional component Tpr* by the position gain Kpo'.

As illustrated in FIG. 17, the fundamental compensation angular speed torque Tvvb* which is computed by the position compensation control circuit 186 is output to a multiplier 211. The angular speed F/B control computation circuit 147 also includes a steering torque compensation gain computation circuit 212 that computes a steering torque compensation gain Kts on the basis of the steering torque Th, and a steering torque compensation adjustment gain computation circuit 213 that computes a steering torque compensation adjustment gain Ktsa for adjusting the steering torque compensation gain Kts.

The steering torque compensation gain computation circuit 212 receives the steering torque Th as an input. The steering torque compensation gain computation circuit 212 includes a map that defines the relationship between the steering torque Th and the steering torque compensation gain Kts, and computes the steering torque compensation gain Kts which matches the steering torque Th by referencing the map. While the map in the present embodiment is set so as to be similar to the map of the non-steering gain computation circuit 135, the map may be set so as to have a different shape. The thus computed steering torque compensation gain Kts is output to a multiplier 214.

The steering torque compensation adjustment gain computation circuit 213 receives, as inputs, the grip state amount Gr and the vehicle speed V. The steering torque compensation adjustment gain computation circuit 213 includes a map that defines the relationship between the grip state amount Gr and the vehicle speed V and the steering torque compensation adjustment gain Ktsa, and computes the steering torque compensation adjustment gain Ktsa which matches the grip state amount Gr and the vehicle speed V by referencing the map. While the map in the present embodiment is set so as to be similar to the map of the inertia adjustment gain computation circuit 152, the map may be set so as to have a different shape. The thus computed steering torque compensation adjustment gain Ktsa is output to the multiplier 214.

In the angular speed F/B control computation circuit 147, the multiplier 214 computes a steering torque compensation gain Kts' as a value obtained by multiplying the steering torque compensation gain Kts by the steering torque compensation adjustment gain Ktsa, and outputs the computed value to the multiplier 211. In the angular speed F/B control computation circuit 147, the multiplier 211 outputs, as the target compensation angular speed torque Tvv*, a value obtained by multiplying the fundamental compensation angular speed torque Tvvb* by the steering torque compensation gain Kts', and outputs the computed value. As described above, the steering torque compensation gain Kts is "0" in the case where the driver is performing a steering operation. Thus, the target compensation angular speed torque Tvv* is output in a non-steering state.

Next, variations in the steering feeling along with adjustment of the input torque fundamental component Tb* will be described. A case where the input torque fundamental component Tb* is adjured on the basis of the grip state amount Gr so as to become smaller than that before the adjustment in a situation in which the vehicle is traveling on a low-μ road surface and the slip angle β tends to become large, for example, is assumed. In this case, the driver can easily recognize road surface information that the vehicle is traveling on a low-μ road with a so-called "escaping feeling" generated by making the steering reaction force, which is applied from the steering-side motor 14 to the steering wheel 11, smaller than that during normal times since before the slip angle β becomes large to enter the critical region, for example.

On the other hand, a case where the input torque fundamental component Tb* is adjusted on the basis of the grip state amount Gr so as to become larger than that before the adjustment in the same situation is assumed. In this case, the steering reaction force, which is applied from the steering-side motor 14 to the steering wheel 11, can be maintained or made larger even if the slip angle β has become large, for example, allowing the driver to continue steering without a sense of discomfort.

Next, variations in the steering feeling along with adjustment of the distributed axial force Fd will be described.

A case where the reaction force component Fir is adjusted on the basis of the grip state amount Gr so as to become smaller than the distributed axial force Fd in a situation in which the vehicle is traveling on a low-μ road surface and the slip angle β tends to become large, for example, is assumed. In this case, the driver can easily recognize road surface information that the vehicle is traveling on a low-μ road with a so-called "escaping feeling" generated by making the steering reaction force, which is applied from the steering-side motor 14 to the steering wheel 11, smaller than that during normal times since before the slip angle β becomes large to enter the critical region, for example.

On the other hand, a case where the reaction force component Fir is adjusted on the basis of the grip state amount Gr so as to become larger than the distributed axial force Fd in the same situation is assumed. In this case, the steering reaction force, which in applied from the steering-side motor 14 to the steering wheel 11, can be made larger even if the slip angle β has become large, for example, allowing the driver to continue steering without a sense of discomfort.

Next, variations in the steering feeling along with adjustment of the target steering angle θh* will be described. A case where the target steering angle θh* is adjusted on the basis of the grip state amount Gr so as to become larger than that before the adjustment in a situation in which the vehicle is traveling on a low-μ road surface and the slip angle β tends to become large, for example, is assumed. In this case, the driver can easily recognize road surface information that the vehicle is traveling on a low-μ road with a so-called "escaping feeling" generated by making the steering reaction force, which is applied from the steering-side motor 14 to the steering wheel 11, smaller than that during normal times since before the slip angle β becomes large to enter the critical region, for example.

When each component, on the basis of which the target steering angle θh* is to be computed, e.g. the target steering acceleration αh* which is computed by the inertia control computation circuit 144, is adjusted on the basis of the grip state amount Gr so as to become larger than that before the adjustment, quick start of movement is enabled when steering is started. Thus, the start of so-called "countersteering", which is a steering operation for returning from the critical region to the normal region, can be expedited, for example. When the target viscosity torque Tvb* which is computed by the viscosity control computation circuit 145 is adjusted on the basis of the grip state amount Gr so as to become smaller than that before the adjustment, for example, quick steering is enabled. Thus, the speed of countersteering can be increased, for example. When the target return viscosity torque Tvr* which is computed by the return viscosity control computation circuit 146 is adjusted on the basis of the grip state amount Gr so as to become smaller than that before the adjustment, for example, the steering wheel 11 quickly approaches the neutral position when a steering operation is not performed, and the speed of so-called "self-countersteering", which is an operation of the steering wheel 11 for returning to the normal region after entering the critical region, can be expedited, for example. When the target compensation angular speed torque Tvv* which is computed by the angular speed F/B control computation circuit 147 is adjusted on the basis of the grip state amount Gr so as to become larger (in the negative direction) than that before the adjustment, for example, the steering wheel 11 quickly approaches the neutral position when a steering operation is not performed. Thus, the speed of self-countersteering can be increased, for example.

On the other hand, a case where the target steering angle θh* is adjusted on the basis of the grip state amount Gr so as to become smaller than that before the adjustment in the same situation is assumed. In this case, the steering reaction force, which is applied from the steering-side motor 14 to the steering wheel 11, can be made larger even if the slip angle β has become large, for example, allowing the driver to continue steering without causing a sense of discomfort. Therefore, further steering toward the critical side can be suppressed.

When each component, on the basis of which the target steering angle θh* is to be computed, e.g. the target steering acceleration αh* which is computed by the inertia control computation circuit 144, is adjusted on the basis of the grip state amount Gr so as to become smaller than that before the adjustment, further acceleration in steering toward the critical side can be suppressed after entering the critical region, for example. When the target viscosity torque Tvb* which is computed by the viscosity control computation circuit 145 is adjusted on the basis of the grip state amount Gr so as to become larger than dial before the adjustment, for example, the damping function is enhanced. Thus, further steering toward the critical side can be suppressed after entering the critical region, for example. When the target return viscosity torque Tvr* which is computed by the return viscosity control computation circuit 146 is adjusted on the basis of the grip state amount Gr so as to become larger than that before the adjustment, for example, the steering wheel 11 slowly approaches the neutral position when a steering operation is not performed, and the speed of self-countersteering can be lowered, for example. When the target compensation angular speed torque Tvv* which is computed by the angular speed F/B control computation circuit 147 is adjusted on the basis of the grip state amount Gr so as to become smaller (in the direction of zero) than that before the adjustment, for example, the steering wheel 11 slowly approaches the neutral position when a steering operation is not performed. Thus, the speed of self-countersteering can be lowered, for example.

The functions and the effects of the present embodiment will be described.

(1) The steering-side control circuit 51 includes the torque command value computation circuit 72 which computes the torque command value Th*, the torque F/B control circuit 73 which computes the input torque fundamental component Tb* through execution of torque feedback control for causing the steering torque Th to follow the torque command value Th*, and the target steering angle computation circuit 64 which computes the target steering angle θh* on the basis of the input torque fundamental component Tb*. The steering-side control circuit 51 computes the target reaction force torque Ts* on the basis of execution of angle feedback control for causing the steering angle θh to follow the target steering angle θh*. In this manner, the input torque fundamental component Tb* is computed by executing torque feedback control in which the steering torque Th which should be input by the driver is caused to follow the torque command value Th*, the input torque fundamental component Tb* is used to compute the target steering angle θh*, and functions to vary the target steering angle θh* and vary the steering reaction force on the basis of such variations in the target steering angle θh*. Consequently, the input torque fundamental component Tb* is provided to the steering device 2 as a steering reaction force that sets to maintain the steering torque Th, which should be input by the driver, at an appropriate value that matches the drive torque Tc. That is, in the case where the steering properties which indicate the relationship between the steering torque Th, which should be input by the driver, and the steered angle of the steered wheels 4, which is output from the steering device 2 for the steering torque Th, are to be optimized, it is only necessary to adjust the input torque fundamental component Tb* through adjustment of the torque command value computation circuit 72. Thus, it is only necessary to adjust the input torque fundamental component Tb* in order to achieve optimum steering properties, which facilitates adjustment compared to a case where it is necessary to adjust the input torque fundamental component Tb* and a different component in consideration of each other, for example.

(2) The steering-side control circuit 51 includes the grip state amount computation circuit 67 which computes the grip state amount Gr on the basis of the ideal axial force Fib, the road surface axial force Fer, and the vehicle state amount axial force Fyr. The torque command value computation circuit 72 computes the torque command value Th* in consideration of the grip state amount Gr, and changes the steering reaction force on the basis of the torque command value. The steering properties can be optimized in accordance with the grip state of the steered wheels 4 by considering the grip state amount Gr in the computation of the torque command value Th* in this manner.

(3) The torque command value computation circuit 72 includes the command fundamental value computation circuit 111 which computes the command fundamental value Thb*, which is the base of the torque command value Th*, on the basis of the drive torque Tc, and the fundamental adjustment gain computation circuit 112 which computes the fundamental adjustment gain Khba, by which the command fundamental value Thb* is to be multiplied. The fundamental adjustment gain computation circuit 112 changes the fundamental adjustment gain Khba on the basis of the grip state amount Gr. Therefore, the effect of the grip state can be reflected in the steering properties as variations in the gradient of the command fundamental value Thb*.

(4) The fundamental adjustment gain computation circuit 112 changes the fundamental adjustment gain Khba in accordance with the vehicle speed V. Therefore, the command fundamental value Thb* can be adjusted suitably in accordance with the vehicle speed V.

(5) The torque command value computation circuit 72 includes the hysteresis component computation circuit 115 which computes the hysteresis component Thy*, and the hysteresis adjustment gain computation circuit 125 which computes the hysteresis adjustment gain Khya, by which the hysteresis component Thy* is to be multiplied. The hysteresis adjustment gain computation circuit 125 changes the hysteresis adjustment gain Khya on the basis of the grip state amount Gr. Therefore, the effect of the grip state can be reflected in the steering properties mainly as variations in the sense of friction in the steering feeling.

(6) The hysteresis adjustment gain computation circuit 125 changes the hysteresis adjustment gain Khya in accordance with the vehicle speed V. Therefore, the hysteresis component Thy* can be optimized suitably in accordance with the vehicle speed V.

(7) In the case where the lateral acceleration LA and the vehicle speed V indicate a low-speed state and the precision of the vehicle state amount axial force Fyr cannot be secured, the grip state amount computation circuit 67 computes the grip state amount Gr at a distribution ratio including the first grip component Gr1 which is based on the ideal axial force Fib and the road surface axial force Fer. In the case where the lateral acceleration LA and the vehicle speed V indicate a mid- to high-speed state and the precision of the vehicle state amount axial force Fyr can be secured, the grip state amount computation circuit 67 computes the grip state amount Gr at a distribution ratio including the second grip component Gr2 which is based on the vehicle state amount axial force Fyr and the road surface axial force Fer. Thus, an appropriate grip state amount Gr can be computed, and the steering reaction force can be compensated for appropriately in consideration of the grip state amount Gr.

(8) The grip state amount computation circuit 67 computes the grip state amount Gr such that the distribution ratio of the second grip component Gr2 becomes higher as the lateral acceleration LA and the vehicle speed V are brought closer from a state that indicates a low-speed state to a state that indicates a mid- to high-speed state. Therefore, the grip state amount Gr can be computed more appropriately.

(9) The distribution ratio setting circuit 106 sets the distribution ratio on the basis of the lateral acceleration LA and the vehicle speed V. Therefore, the grip state amount Gr can be computed by determining the travel state of the vehicle on the basis of appropriate travel state amounts.

(10) The steering-side control circuit 51 adjusts the distributed axial force Fd on the basis of the grip state amount Gr, and changes the steering reaction force in consideration of the reaction force component Fir which is the distributed axial force after being adjusted. The steering feeling is basically achieved by an inertial feel, a viscous feel, and a rigid feel represented by the inertia term, the viscosity term, and the spring term, respectively, of an equation of motion that indicates the relationship between the input torque Tin* which is input to the steering device 2 and the steered angle. By adjusting the distributed axial force Fd, which corresponds to the spring term of the equation of motion, on the basis of the grip state amount Gr as in the present embodiment, the rigid feel of a steering operation that matches the grip state can be provided as a responsive feel to the driver to achieve a good steering feeling.

(11) The distributed axial force adjustment circuit 98 includes the distributed adjustment gain computation circuit 131 which computes the distributed adjustment gain Kaa, by which the distributed axial force Fd is to be multiplied, and adjusts the distributed axial force Fd by multiplying the distributed axial force Fd by the distributed adjustment gain Kaa. The distributed adjustment gain computation circuit 131 changes the distributed adjustment gain Kaa on the basis of the grip state amount Gr. Therefore, the rigid feel of a steering operation can be adjusted on the basis of the gradient of the reaction force component Fir (distributed axial force after being adjusted), that is, variations in the spring constant of the spring term.

(12) The distributed adjustment gain computation circuit 131 changes the distributed adjustment gain Kaa in accordance with the vehicle speed V. Therefore, the grip state which is varied in accordance with the vehicle speed V can be provided as a responsive feel to the driver through the rigid feel of a steering operation achieved on the basis of the distributed adjustment gain Kaa.

(13) The distributed axial force adjustment circuit 98 includes the offset value computation circuit 134 which computes the offset value Of to be added to the distributed axial force Fd, and adjusts the distributed axial force Fd by adding the offset value Of thereto. The offset value computation circuit 134 changes the offset value Of on the basis of the grip state amount Gr. Therefore, the rigid feel of a steering operation that matches the grip state amount Gr can be provided as a constant responsive feel to the driver irrespective of the spring constant of the spring term. Thus, a good steering feeling can be achieved.

(14) The distributed axial force adjustment circuit 98 includes the non-steering gain computation circuit 135 which computes the non-steering gain Kns1, by which the offset value Of is to be multiplied, and the non-steering gain computation circuit 135 computes the offset value Of as a value that is larger than zero only when a steering operation is not performed. Therefore, the distributed axial force Fd is adjusted by adding the offset value Of thereto in a state in which the driver is not substantially performing a steering operation. Therefore, a steering speed ωh of the steering wheel 11 during return can be adjusted in accordance with the grip state.

(15) The offset value computation circuit 134 changes the offset value Of in accordance with the vehicle speed V. Therefore, the grip state which is varied in accordance with the vehicle speed V can be provided as a responsive feel to the driver through the rigid feel of a steering operation achieved on the basis of the offset value Of.

(16) The steering-side control circuit 51 computes the target steering angle θh* in consideration of the grip state amount Gr, and computes the target reaction force torque Ts* by executing feedback control such that the steering angle θh follows the target steering angle θh*. In this manner, the target steering angle θh*, on the basis of which the target reaction force torque Ts* is to be computed, is determined with the grip state amount Gr taken into account. Therefore, a good steering feeling can be achieved.

(17) The inertia control computation circuit 144 includes the inertia reciprocal gain computation circuit 151 which computes the inertia reciprocal gain Kii on the basis of the target steering acceleration αh*, and the inertia adjustment gain computation circuit 152 which computes the inertia adjustment gain Kiia, by which the inertia reciprocal gain Kii is to be multiplied, and computes the target steering acceleration αh* by multiplying the input torque Tin* by the inertia reciprocal gain Kii. The inertia control computation circuit 144 changes the inertia adjustment gain Kiia on the basis of the grip state amount Gr, and changes the target steering acceleration αh* through adjustment of the inertia reciprocal gain Kii made by multiplying the inertia reciprocal gain Kii by the inertia adjustment gain Kiia. Therefore, the inertial feel of a steering feeling can be adjusted suitably in accordance with the grip state.

(18) The inertia adjustment gain computation circuit 152 changes the inertia adjustment gain Kiia in accordance with the vehicle speed V. Therefore, the inertia reciprocal gain Kii can be adjusted suitably in accordance with the vehicle speed V.

(19) The viscosity control computation circuit 145 includes the viscosity gain computation circuit 161 which computes the viscosity gain Kvb in accordance with the target steering speed ωh*, and the viscosity adjustment gain computation circuit 162 which computes the viscosity adjustment gain Kvba, by which the viscosity gain Kvb is to be multiplied, and computes the target viscosity torque Tvb* on the basis of the target steering speed ωh* and the viscosity gain Kvb. The viscosity adjustment gain computation circuit 162 changes the viscosity adjustment gain Kvba on the basis of the grip state amount Gr, and changes the target viscosity torque Tvb* through adjustment of the viscosity gain Kvb made by multiplying the viscosity gain Kvb by the viscosity adjustment gain Kvba. Therefore, the viscous feel of a steering feeling can be adjusted suitably in accordance with the grip state.

(20) The viscosity adjustment gain computation circuit 162 changes the viscosity adjustment gain Kvba in accordance with the vehicle speed V. Therefore, the viscosity gain Kvb can be adjusted suitably in accordance with the vehicle speed V.

(21) The return viscosity control computation circuit 146 includes the return viscosity gain computation circuit 172 which computes the return viscosity gain Kvr on the basis of the target steering speed ωh* and the return viscosity adjustment gain computation circuit 173 which computes the return viscosity adjustment gain Kvra, by which the return viscosity gain Kvr is to be multiplied. The return viscosity control computation circuit 146 computes the target return viscosity torque Tvr* on the basis of the target steering speed ωh* and the return viscosity gain Kvr. The return viscosity adjustment gain computation circuit 173 changes the return viscosity adjustment gain Kvra on the basis of the grip state amount Gr, and changes the target return viscosity torque Tvr* through adjustment of the return viscosity gain Kvr made by multiplying the return viscosity gain Kvr by the return viscosity adjustment gain Kvra. Therefore, the viscous feel in a non-steering state can be adjusted suitably in accordance with the grip state.

(22) The return viscosity adjustment gain computation circuit 173 changes the return viscosity adjustment gain Kvra in accordance with the vehicle speed V. Therefore, the return viscosity adjustment gain Kvra can be adjusted suitably in accordance with the vehicle speed V.

(23) The angular speed F/B control computation circuit 147 includes the target compensation angular speed computation circuit 181 which computes the target compensation angular speed ωr* on the basis of the target steering angle θh*, and the compensation angular speed adjustment gain computation circuit 182 which computes the compensation angular speed adjustment gain Kra, by which the target compensation angular speed ωr* is to be multiplied. The angular speed F/B control computation circuit 147 computes the target compensation angular speed torque Tvv* on the basis of the angular speed deviation Δω between the target compensation angular speed ωr* and the target steering speed ωh*. The compensation angular speed adjustment gain computation circuit 182 changes the compensation angular speed adjustment gain Kra on the basis of the grip state amount Gr, and changes the target compensation angular speed torque Tvv* through adjustment of the target compensation angular speed ωr* made by multiplying the target compensation angular speed ωr* by the compensation angular speed adjustment gain Kra. Therefore, the target compensation angular speed ωr* can be adjusted suitably in accordance with the grip state.

(24) The compensation angular speed adjustment gain computation circuit 182 changes the compensation angular speed adjustment gain Kra in accordance with the vehicle speed V. Therefore, the target compensation angular speed ωr* can be adjusted suitably in accordance with the vehicle speed V.

(25) The angular speed F/B control computation circuit 147 includes the proportional gain computation circuit 191 which computes the proportional gain Kpr, and the proportional adjustment gain computation circuit 192 which computes the proportional adjustment gain Kpra, by which the proportional gain Kpr is to be multiplied. The angular speed F/B control computation circuit 147 changes the target compensation angular speed torque Tvv* by multiplying the angular speed deviation Δω by the proportional gain Kpr. Therefore, suitable target compensation angular speed torque Tvv* that matches the vehicle speed V can be computed. The proportional adjustment gain computation circuit 192 changes the proportional gain Kpr on the basis of the grip state amount Gr. Therefore, the grip state can be reflected in the proportional gain Kpr which is the base of the target compensation angular speed torque Tvv*.

(26) The proportional adjustment gain computation circuit 192 changes the proportional adjustment gain Kpra in accordance with the vehicle speed V. Therefore, the proportional gain Kpr can be adjusted suitably in accordance with the vehicle speed V.

(27) The angular speed F/B control computation circuit 147 includes the position gain computation circuit 201 which computes the position gain Kpo on the basis of the target steering angle θh*, and the position adjustment gain computation circuit 202 which computes the position adjustment gain Kpoa, by which the position gain Kpo is to be multiplied. The angular speed F/B control computation circuit 147 changes the target compensation angular speed torque Tvv* by multiplying the proportional component Tpr*, which is based on the angular speed deviation by the position gain Kpo'. Therefore, suitable target compensation angular speed torque Tvv* that matches the target steering angle θh* can be computed. The position adjustment gain computation circuit 202 changes the position adjustment gain Kpoa on the basis of the grip state amount Gr. Therefore, the grip state can be reflected in the position gain Kpo, on the basis of which the target compensation angular speed torque Tvv* is to be computed.

(28) The position adjustment gain computation circuit 202 changes the position adjustment gain Kpoa in accordance with the vehicle speed V. Therefore, the position adjustment gain Kpoa can be adjusted suitably in accordance with the vehicle speed V.

(29) The angular speed F/B control computation circuit 147 includes the steering torque compensation gain computation circuit 212 which computes the steering torque compensation gain Kts on the basis of the steering torque Th, and the steering torque compensation adjustment gain computation circuit 213 which computes the steering torque compensation adjustment gain Ktsa, by which the steering torque compensation gain Kts is to be multiplied. The angular speed F/B control computation circuit 147 changes the target compensation angular speed torque Tvv* by multiplying the fundamental compensation angular speed torque Tvvb*, which is a value based on the angular speed deviation Δω, by the steering torque compensation gain Kts. The steering torque compensation gain computation circuit 212 computes the steering torque compensation adjustment gain Ktsa as zero in the case where the absolute value of the steering torque Th is higher than the non-steering threshold Tth. Therefore, the target compensation angular speed torque Tvv* is reflected in the target steering angle θh* in a non-steering state in which the driver does not input a steering operation to the steering portion 3. Consequently, the steering speed of the steering wheel 11 during return can be adjusted in accordance with the grip state.

(30) The steering torque compensation adjustment gain computation circuit 213 changes the steering torque compensation adjustment gain Ktsa in accordance with the vehicle speed V. Therefore, the steering torque compensation gain Kts can be adjusted suitably in accordance with the vehicle speed V.

Next, a steering control device according to a second embodiment of the present invention will be described with reference to the drawings. For convenience of description, identical components are given the same reference numerals as those according to the first embodiment to omit description.

Figure 20:
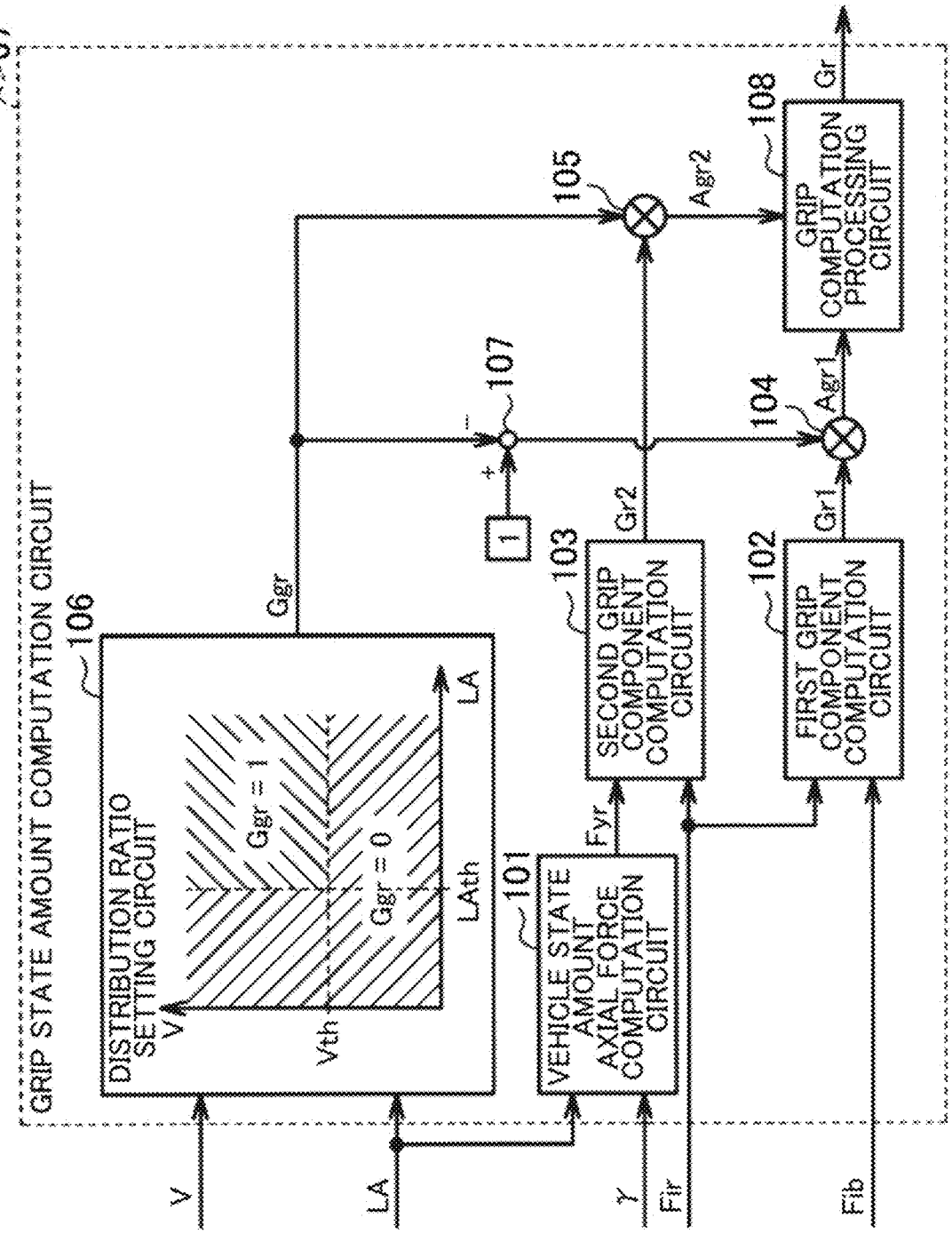
FIG. 20 is a block diagram of a distributed axial force adjustment circuit according to a second embodiment.

As illustrated in FIG. 20, in the case where at least one of the vehicle speed V and the lateral acceleration LA indicates that the vehicle is in a low-speed state, the distribution ratio setting circuit 106 according to the present embodiment computes the grip state amount Gr at a distribution ratio Ggr including only the first grip component Gr1 by referencing the map illustrated in the drawing. In the case where both the vehicle speed V and the lateral acceleration LA indicate that the vehicle is in a mid- to high-speed state, meanwhile, the distribution ratio setting circuit 106 computes the grip state amount Gr at a distribution ratio Ggr including only the second grip component Gr2. Specifically, the map illustrated in the drawing is set such that the distribution ratio Ggr is zero in the case where the lateral acceleration LA is equal to or less than the lateral acceleration threshold LAth or in the case where the vehicle speed V is equal to or less than the vehicle speed threshold Vth, and the distribution ratio Ggr is "1" in the case where the lateral acceleration LA is higher than the lateral acceleration threshold LAth and the vehicle speed V is higher than the vehicle speed threshold Vth.

As in the first embodiment, the thus computed grip state amount Gr is input to the input torque fundamental component computation circuit 62 (torque command value computation circuit 72), the reaction force component computation circuit 63 (distributed axial force adjustment circuit 98), and the target steering angle computation circuit 64.

Next, the functions and the effects of the present embodiment will be described. With the present embodiment, the following effects can be obtained in addition to the functions and effects (1) to (7) and (9) to (30) of the first embodiment.

(31) In the case where at least one of the lateral acceleration LA and the vehicle speed V indicates that the vehicle is in a low-speed state, the grip state amount computation circuit 67 computes the grip state amount Gr which includes only the first grip component Gr1 which is based on the ideal axial force Fib, that is, without using the second grip component Gr2 which is based on the vehicle state amount axial force Fyr. As described above, the first grip component Gr1 is a value based on the ideal axial force Fib which is precise when the vehicle is in a low-speed state, and not based on the vehicle state amount axial force Fyr which is less precise when the vehicle is in a mid- to high-speed state. Therefore, the grip state amount computation circuit 67 according to the present embodiment can compute the grip state amount Gr more appropriately.

(32) In the case where both the lateral acceleration LA and the vehicle speed V indicate that the vehicle is in a mid- to high-speed state, the grip state amount computation circuit 67 computes the grip state amount Gr which includes only the second grip component Gr2 which is based on the vehicle state amount axial force Fyr, that is, without using the first grip component Gr1 which is based on the ideal axial force Fib and the road surface axial force Fer. As described above, the second grip component Gr2 is a value based on the vehicle state amount axial force Fyr which is precise when the vehicle is in a mid- to high-speed state, and not based on the ideal axial force Fib which is less precise when the vehicle is in a mid- to high-speed state. Therefore, the grip state amount computation circuit 67 according to the present embodiment can compute the grip state amount Gr more appropriately.

The embodiments can be implemented in modified forms as described below. The embodiments and the following modifications can be implemented in combination with each other as long as there is no technical contradiction. In each of the above embodiments, the fundamental adjustment gain Khba may be constant, rather than being changed in accordance with the vehicle speed V. Similarly, the hysteresis adjustment gain Khya, the distributed adjustment gain Kaa, the inertia adjustment gain Kiia, die viscosity adjustment gain Kvba, the return viscosity adjustment gain Kvra, the compensation angular speed adjustment gain Kra, the steering torque compensation adjustment gain Ktsa, the proportional adjustment gain Kpra, and the position adjustment gain Kpoa may be constant, rather than being changed in accordance with the vehicle speed V. In addition, the offset value Of may be constant, rather than being changed in accordance with the vehicle speed V.

In each of the above embodiments, the shape of the map of the command fundamental value computation circuit 111, the base value gain computation circuit 123, the inertia reciprocal gain computation circuit 151, the viscosity gain computation circuit 161, the return viscosity gain computation circuit 172, the target compensation angular speed computation circuit 181, the proportional gain computation circuit 191, and the position gain computation circuit 201 is changeable as appropriate.

In each of the above enbodiments, the command fundamental value Thb* is changed in accordance with the grip state amount Gr through adjustment of the fundamental adjustment gain Khba which is based on the grip state amount Gr. However, the present invention is not limited thereto. For example, the torque command value computation circuit 72 may compute the command fundamental value Thb*' as a single value obtained by combining the command fundamental value Thb* and the fundamental adjustment gain Khba, and the command fundamental value Thb*' may be changed directly in accordance with the grip state amount Gr. The aspect of the present invention is changeable as appropriate.

In each of the above embodiments, the hysteresis component Thy* is changed in accordance with the grip state amount Gr through adjustment of the hysteresis adjustment gain Khya which is based on the grip state amount Gr. However, the present invention is not limited thereto. For example, the hysteresis component computation circuit 115 may compute the base value Thyb* as a single value obtained by combining the base value Thyb* and the hysteresis adjustment gain Khya, and the hysteresis component Thy* may be changed directly in accordance with the grip state amount Gr. The aspect of the present invention is changeable as appropriate.

In each of the above embodiments, the hysteresis component computation circuit 115 may be configured not to include the base value gain computation circuit 123. In each of the above embodiments, the torque command value computation circuit 72 may be configured not to include the hysteresis component computation circuit 115.

In each of the above embodiments, the steering-side control circuit 51 may compute the target reaction force torque Ts* without considering the grip state amount Gr. In the above second embodiment, the grip state amount Gr may be computed on the basis of only the second grip component Gr2 in the case where the vehicle speed V and the lateral acceleration LA indicate that the vehicle is in a mid- to high-speed state, and the grip state amount Gr may be computed on the basis of the first and second grip components Gr1 and Gr2 in the case where the vehicle speed V and the lateral acceleration LA indicate that the vehicle is in a low-speed state. Alternatively, the grip state amount Gr may be computed on the basis of only the first grip component Gr1 in the case where the vehicle speed V and the lateral acceleration LA indicate that the vehicle is in a low-speed state, and the grip state amount Gr may be computed on the basis of the first and second grip components Gr1 and Gr2 in the case where the vehicle speed V and the lateral acceleration LA indicate that the vehicle is h a mid- to high-speed state.

In each of the above embodiments, the manner of implementation of the zero division prevention function is changeable as appropriate. For example, the vehicle state amount axial force Fyr can be at a lower limit value set in advance in the case where the absolute value of the vehicle state amount axial force Fyr is equal to or less than the zero threshold F0. The first grip component computation circuit 102 and the second grip component computation circuit 103 may not have a zero division prevention function.

In each of the above embodiments, the distribution ratio setting circuit 106 sets the distribution ratio Ggr using the lateral acceleration LA and the vehicle speed V as the travel state amounts. However, the present invention is not limited thereto. For example, the distribution ratio Ggr may be set using only one of the lateral acceleration LA and the vehicle speed V. Alternatively, the distribution ratio Ggr may be set using other parameters such as the yaw rate $\gamma$, for example.

In each of the above embodiments, a grip level obtained by dividing the road surface axial force Fer by the ideal axial force Fib is used as the first grip component Gr1. However, the present invention is not limited thereto. A grip loss level (a value that indicates how much of the grip of the steered wheels 4 is lost) obtained by subtracting the ideal axial force Fib from the road surface axial force Fer may be used as the first grip component Gr1. Similarly, a grip loss level obtained by subtracting the vehicle state amount axial force Fyr from the road surface axial force Fer may be used as the second grip component Gr2.

In each of the above embodiments, the grip state amount Gr is computed by summing the first grip component Gr1, which is based on the road surface axial force Fer and the ideal axial force Fib, and the second grip component Gr2, which is based on the road surface axial force Fer and the vehicle state amount axial force Fyr, at predetermined distribution ratios. However, the present invention is not limited thereto. For example, a third grip component may be computed on the basis of the ideal axial force Fib and the vehicle state amount axial force Fyr, and the grip state amount Gr may be computed by summing such grip components at predetermined distribution ratios. Alternatively, the grip state amount Gr may be computed as the second grip component Gr2 as it is, for example, rather than summing the first grip component Gr1 and the second grip component Gr2 at predetermined distribution ratios.

In each of the above embodiments, the distributed axial force adjustment circuit 98 may be configured not to include the non-steering gain Kns1. In each of the above embodiments, the manner in which the distributed axial force adjustment circuit 98 adjusts the distributed axial force Fd is changeable as appropriate, and the distributed axial force adjustment circuit 98 may adjust the distributed axial force Fd by only multiplying the distributed adjustment gain Kaa or only adding the offset value Of.

In each of the above embodiments, the inertia reciprocal gain Kii' is changed in accordance with the grip state amount Gr through adjustment of the inertia adjustment gain Kiia which is based on the grip state amount Gr. However, the present invention is not limited thereto. For example, the inertia control computation circuit 144 may compute the inertia reciprocal gain Kii' as a single gain obtained by combining the inertia reciprocal gain Kii and the inertia adjustment gain Kiia, and the inertia reciprocal gain Kii' may be changed directly in accordance with the grip state amount Gr. The aspect of the present invention is changeable as appropriate.

In each of the above embodiments, the viscosity gain Kvb' is changed in accordance with the grip state amount Gr through adjustment of the viscosity adjustment gain Kvba which is based on the grip state amount Gr. However, the present invention is not limited thereto. For example, the viscosity control computation circuit 145 may compute the viscosity gain Kvb' as a single gain obtained by combining the viscosity gain Kvb and the viscosity adjustment gain Kvba, and the viscosity gain Kvb' may be changed directly in accordance with the grip state amount Gr. The aspect of the present invention is changeable as appropriate.

In each of the above embodiments, the return viscosity gain Kvr' is changed in accordance with the grip state amount Gr through adjustment of the return viscosity adjustment gain Kvra which is based on the grip state amount Gr. However, the present invention is not limited thereto. For example, the return viscosity control computation circuit 146 may compute the return viscosity gain Kvr' as a single gain obtained by combining the return viscosity gain Kvr and the return viscosity adjustment gain Kvra, and the return viscosity gain Kvr' may be changed directly in accordance with the grip state amount Gr. The aspect of the present invention is changeable as appropriate.

In each of the above embodiments, the target compensation angular speed $\omega r^{*\prime}$ is changed in accordance with the grip state amount Gr through adjustment of the compensation angular speed adjustment gain Kra which is based on the grip state amount Gr. However, the present invention is not limited thereto. For example, the angular speed F/B control computation circuit 147 may compute the target compensation angular speed $\omega r^{*\prime}$ as a single value obtained by combining the target compensation angular speed $\omega r^*$ and the compensation angular speed adjustment gain Kra, and the target compensation angular speed $\omega r^{*\prime}$ may be changed directly in accordance with the grip state amount Gr. The aspect of the present invention is changeable as appropriate.

In each of the above embodiments, the proportional gain Kpr' is changed in accordance with the grip state amount Gr through adjustment of the proportional adjustment gain Kpra which is based on the grip state amount Gr. However, the present invention is not limited thereto. For example, the proportional compensation control circuit 185 may compute the proportional gain Kpra' as a single gain obtained by combining the proportional gain Kpr and the proportional adjustment gain Kpra, and the proportional gain Kpra' may be changed directly in accordance with the grip state amount Gr. The aspect of the present invention is changeable as appropriate.

In each of the above embodiments, the position gain Kpo' is changed in accordance with the grip state amount Gr through adjustment of the position adjustment gain Kpoa which is based on the grip state amount Gr. However, the present invention is not limited thereto. For example, the position compensation control circuit 186 may compute the position gain Kpo' as a single gain obtained by combining the position gain Kpo and the position adjustment gain Kpoa, and the position gain Kpo' may be changed directly in accordance with the grip state amount Gr. The aspect of the present invention is changeable as appropriate.

In each of the above embodiments, the steering torque compensation gain Kts' is changed in accordance with the grip state amount Gr through adjustment of the steering torque compensation adjustment gain Ktsa which is based on the grip state amount Gr. However, the present invention is not limited thereto. For example, the angular speed F/B control computation circuit 147 may compute the steering torque compensation gain Kts' as a single gain obtained by combining the steering torque compensation gain Kts and the steering torque compensation adjustment gain Ktsa, and the steering torque compensation gain Kts' may be changed directly in accordance with the grip state amount Gr. The aspect of the present invention is changeable as appropriate.

In each of the above embodiments, the non-steering gain computation circuit 135 computes the non-steering gain Kns1 on the basis of the steering torque Th (torsion bar torque) which is detected by the torque sensor 42. However, the present invention is not limited thereto. The non-steering gain Kns1 may be computed on the basis of torque (estimated steering torque) applied to the steering wheel 11 by the driver. The estimated steering torque can be detected by a sensor provided to the steering wheel 11, for example, or calculated through computation from the steering torque Th. Similarly, the non-steering gain computation circuit 177 may compute the non-steering gain Kns2 on the basis of the estimated steering torque, and the steering torque compensation gain computation circuit 212 may compute the steering torque compensation gain Kts on the basis of the estimated steering torque.

In each of the above embodiments, the return viscosity control computation circuit 146 may be provided with a non-steering adjustment gain computation circuit that computes a non-steering adjustment gain for adjusting the non-steering gain Kns2. The non-steering adjustment gain computation circuit can be configured similarly to the steering torque compensation adjustment gain computation circuit 213, for example. The non-steering adjustment gain computation circuit may change the non-steering adjustment gain in accordance with the vehicle speed V.

In each of the above embodiments, the steering torque compensation adjustment gain Ktsa may be computed so as not to be zero in the case where the absolute value of the steering torque Th is higher than the non-steering threshold Tth. In this case, suitable target compensation angular speed torque Tvv* which matches the steering torque Th can be computed by multiplying the fundamental compensation angular speed torque Tvvb* by the steering torque compensation gain Kts, which is based on the steering torque Th.

In each of the above embodiments, the position compensation control circuit 186 computes the position gain Kpo on the basis of the target steering angle $\theta h^*$. However, the present invention is not limited thereto. For example, the position gain Kpo may be computed on the basis of the steering angle $\theta h$.

In each of the above embodiments, the target compensation angular speed computation circuit 181 computes the target compensation angular speed $\omega r^*$ on the basis of the target steering angle $\theta h^*$. However, the present invention is not limited thereto. For example, the target compensation angular speed $\omega r^*$ may be computed on the basis of the steering angle $\theta h$.

In each of the above embodiments, the angular speed F/B control computation circuit 147 computes the angular speed deviation $\Delta \omega$ by subtracting the target steering speed $\omega h^*$ from the target compensation angular speed $\omega r^*$. However, the present invention is not limited thereto. For example, the angular speed deviation $\Delta \omega$ may be computed by subtracting a steering speed $\omega s$, which is based on the differential of the steering angle $\theta h$, from the target compensation angular speed $\omega r^*$.

In each of the above embodiments, the angular speed F/B control computation circuit 147 may be configured not to include one or any of the proportional compensation control circuit 185, the position compensation control circuit 186, and the steering torque compensation gain computation circuit 212.

In each of the above embodiments, the viscosity control computation circuit 145 computes the target viscosity torque Tvb* by multiplying the target steering speed ωh* by the viscosity gain Kvb'. However, the present invention is not limited thereto. For example, the target viscosity torque Tvb* may be computed by multiplying a sign signal extracted from the target steering speed ωh* by the viscosity gain Kvb'. In addition, the return viscosity control computation circuit 146 may compute the target return viscosity torque Tvr* by multiplying the target steering speed ωh* by the return viscosity gain Kvr'.

In each of the above embodiments, the target steering angle computation circuit 64 may be configured not to include one or either of the return viscosity control computation circuit 146 and the angular speed F/B control computation circuit 147. In each of the above embodiments, at least one of the inertia control computation circuit 144, the viscosity control computation circuit 145, the return viscosity control computation circuit 146, and the angular speed F/B control computation circuit 147 may perform computation in consideration of the grip state amount Gr, and the other computation circuits may not perform computation in consideration of the grip state amount Gr.

In each of the above embodiments, the road surface axial force Fer is computed on the basis of the q-axis current value Iqt. However, the present invention is not limited thereto. For example, the rack shaft 22 may be provided with a pressure sensor that can detect an axial force etc., and the detection result of the sensor may be used as the road surface axial force Fer.

In each of the above embodiments, the ideal axial force Fib is computed on the basis of the target steering angle θh* (target corresponding steered angle) and the vehicle speed V. However, the present invention is not limited thereto, the ideal axial force Fib may be computed on the basis of only the target steering angle θh* (target corresponding steered angle), or may be computed on the basis of the corresponding steered angle θp. Further, the ideal axial force Fib may be computed by a different method such as by taking into account other parameters such as the steering torque Th and the vehicle speed V, for example.

In each of the above embodiments, the distributed axial force Fd is computed by distributing the ideal axial force Fib and the road surface axial force Fer at predetermined proportions. However, the present invention is not limited thereto. For example, the distributed axial force Fd may be computed by distributing the ideal axial force Fib and the vehicle state amount axial force Fyr at predetermined proportions. The manner of computing the distributed axial force Fd is changeable as appropriate.

In each of the above embodiments, the vehicle state amount axial force Fyr is computed on the basis of the yaw rate γ and the lateral acceleration LA. However, the present invention is not limited thereto. For example, the vehicle state amount axial force Fyr may be computed on the basis of only one of the yaw rate γ and the lateral acceleration LA.

In each of the above embodiments, the distributed axial force computation circuit 93 may compute the distribution gains Gib and Ger by taking into account a parameter other than the vehicle speed V. For example, for a vehicle that enables selection of one of a plurality of drive modes that indicate the state of setting of the control pattern for an engine or the like mounted on the vehicle, the drive mode may be used as a parameter for selling the distribution gains Gib and Ger. In this case, the distributed axial force computation circuit 93 may include a plurality of maps with different tendencies with respect to the vehicle speed V for each drive mode, and be configured to compute the distribution gains Gib and Ger by referencing the maps.

In each of the above embodiments, the reaction force component computation circuit 63 computes the distributed axial force after being adjusted as the reaction force component Fir. However, the present invention is not limited thereto. For example, a value obtained from the distributed axial force after being adjusted by taking into account a different reaction force may be computed as the reaction force component Fir. Examples of such a reaction force include an end reaction force which is a reaction force that resists a further steering-forth operation in the case where the absolute value of the steering angle θh of the steering wheel 11 is brought closer to a steering angle threshold. The steering angle threshold may be the corresponding steered angle θp at a near-virtual rack end position located on the neutral position side by a predetermined angle with respect to a virtual rack end position set on the neutral position side with respect to a mechanical rack end position at which axial movement of the rack shaft 22 is regulated with the rack end 25 abutting against the rack housing 23, for example. Alternatively, the steering angle threshold may be the steering angle θh with the steering wheel 11 at a rotation end position.

In each of the above embodiments, the target steering angle computation circuit 64 sets the target steering angle θh* on the basis of the steering torque Th and the vehicle speed V. However, the present invention is not limited thereto. The target steering angle θh* may be set without using the vehicle speed V, for example, as long as the target steering angle θh* is set on the basis of at least the steering torque Th.

In each of the above embodiments, the steering angle ratio between the steering angle θh and the corresponding steered angle θp is constant. However, the present invention is not limited thereto. The steering angle ratio may be variable in accordance with the vehicle speed or the like. In this case, the target steering angle θh* and the target corresponding steered angle have different values.

In each of the above embodiments, the target steering angle computation circuit 64 may compute the target steering angle θh* utilizing a model formula modeled with a so-called spring term added thereto, that uses a spring coefficient K determined in accordance with the specifications of suspensions, wheel alignment, or the like.

In each of the above embodiments, the target reaction force torque computation circuit 65 computes the target reaction force torque Ts* by adding the input torque fundamental component Tb* to the fundamental reaction force torque. However, the present invention is not limited thereto. For example, the fundamental reaction force torque may be computed, as it is, as the target reaction force torque Ts* without adding the input torque fundamental component Tb* thereto.

In each of the above embodiments, the rack shaft 22 may be supported by a bushing or the like, for example, in place of the first rack-and-pinion mechanism 24. In each of the above embodiments, the steered-side actuator 31 may be configured such that the steered-side motor 33 is disposed coaxially with the rack shaft 22, the steered-side motor 33 is disposed in parallel with the rack shaft 22, etc., for example.

In each of the above embodiments, the steering device 2 to be controlled by the steering control device 1 is a linkless steer-by-wire steering device in which the steering portion 3 and the steered portion 5 are mechanically separated from each other. However, the present invention is not limited thereto. The steering device 2 may be a steer-by-wire steering device in which the steering portion 3 and the steered portion 5 are mechanically engageable with and disengageable from each other through a clutch.

Figure 21:
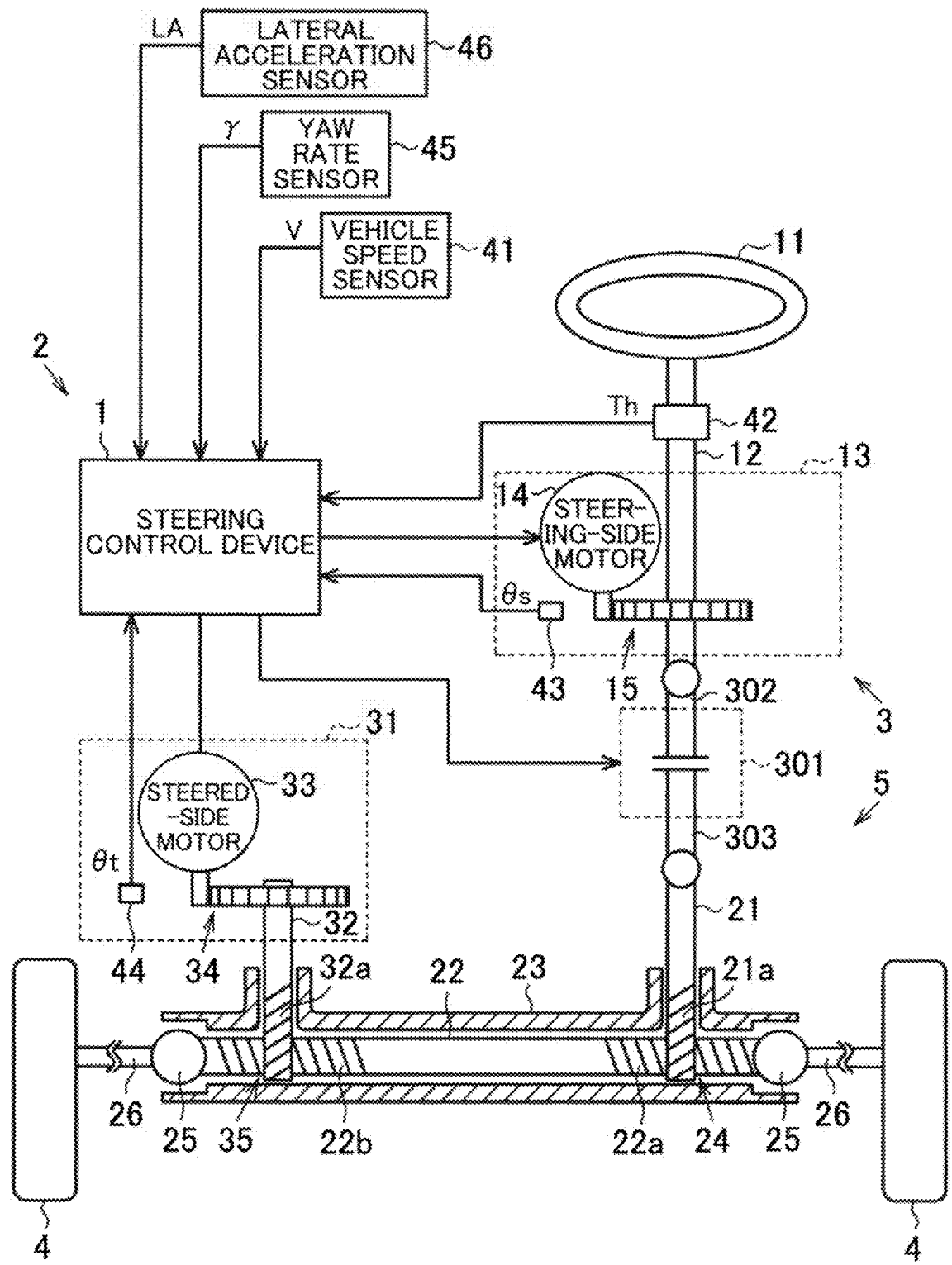
FIG. 21 is a schematic diagram illustrating the configuration of a steering device of a steer-by-wire type according to a modification.

For example, in the example illustrated in FIG. 21, a clutch 301 is provided between the steering portion 3 and the steered portion 5. The clutch 301 is coupled to the steering shaft 12 via an input-side intermediate shaft 302 which is fixed to an input-side element of the clutch 301, aid coupled to the first pinion shaft 21 via an output-side intermediate shaft 303 which is fixed to an output-side element of the clutch 301. The steering device 2 is brought into a steer-by-wire mode when the clutch 301 is disengaged by a control signal from the steering control device 1. The steering device 2 is brought into an electric power steering mode when the clutch 301 is engaged.

What is claimed is:

1. A steering control device that controls a steering device in which a steering portion and a steered portion, which steers steered wheels in accordance with a steering operation input to the steering portion, are mechanically separated from each other, or mechanically engageable with and disengageable from, each other, the steering control device comprising:
    a control circuit that controls operation of a steering-side motor that applies a steering reaction force that resists the steering operation which is input to the steering portion, wherein:
    the control circuit includes
        a torque command value computation circuit that computes a torque command value corresponding to a target value for steering torque that is to be input by a driver for drive torque input to the steering device,
        a torque feedback control circuit that computes an input torque fundamental component on the basis of execution of torque feedback control for causing the steering torque to follow the torque command value, and
        a target steering angle computation circuit that computes a target steering angle, which is a target value for a steering angle of a steering wheel coupled to the steering portion, on the basis of the input torque fundamental component; and
    the control circuit computes target reaction force torque, which is a target value for the steering reaction force, on the basis of execution of angle feedback control for causing the steering angle to follow the target steering angle.

2. The steering control device according to claim 1, further comprising:
    a plurality of axial force computation circuits that compute a plurality of types of axial forces, which act on a steered shaft to which the steered wheels are coupled, on the basis of different state amounts; and
    a grip state amount computation circuit that computes a grip state amount on the basis of the plurality of types of axial forces wherein
    the torque command value computation circuit computes the torque command value in consideration of the grip state amount.

3. The steering control device according to claim 2, wherein:
    the torque command value computation circuit includes
        a command fundamental value computation circuit that computes a command fundamental value, which is a base of the torque command value, on the basis of the drive torque, and
        a fundamental adjustment gain computation circuit that computes a fundamental adjustment gain, by which the command fundamental value is to be multiplied; and
    the fundamental adjustment gain computation circuit changes the fundamental adjustment gain on the basis of the grip state amount.

4. The steering control device according to claim 3, wherein
    the fundamental adjustment gain computation circuit changes the fundamental adjustment gain in accordance with a vehicle speed.

5. The steering control device according to claim 2, wherein:
    the torque command value computation circuit includes
        a hysteresis component computation circuit that computes a hysteresis component on the basis of the drive torque such that the torque command value has hysteresis characteristics in accordance with a direction of the drive torque, and
        a hysteresis adjustment gain computation circuit that computes a hysteresis adjustment gain, by which the hysteresis component is to be multiplied, and
    the hysteresis adjustment gain computation circuit changes the hysteresis adjustment gain on the basis of the grip state amount.

6. The steering control device according to claim 5, wherein
    the hysteresis adjustment gain computation circuit changes the hysteresis adjustment gain in accordance with a vehicle speed.

* * * * *